US008620472B2

(12) United States Patent
Mockus et al.

(10) Patent No.: US 8,620,472 B2
(45) Date of Patent: *Dec. 31, 2013

(54) DISPENSING MECHANISM FOR CENTRALIZED ROBOTIC GANTRY

(75) Inventors: Darrell Scott Mockus, San Francisco, CA (US); Mara Clair Segal, San Francisco, CA (US)

(73) Assignee: Utique, Inc., San Francisco, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 13/228,320

(22) Filed: Sep. 8, 2011

(65) Prior Publication Data

US 2012/0078412 A1 Mar. 29, 2012

Related U.S. Application Data

(63) Continuation-in-part of application No. 12/806,862, filed on Aug. 23, 2010, now Pat. No. 8,392,019.

(60) Provisional application No. 61/237,604, filed on Aug. 27, 2009, provisional application No. 61/380,810, filed on Sep. 8, 2010.

(51) Int. Cl.
*G06F 17/00* (2006.01)

(52) U.S. Cl.
USPC ............ 700/242; 221/127; 221/133; 700/231

(58) Field of Classification Search
USPC ............ 221/126, 127, 133, 112, 95; 700/231, 700/241, 242, 243, 244
See application file for complete search history.

(56) References Cited

U.S. PATENT DOCUMENTS

| | | | | |
|---|---|---|---|---|
| 4,203,305 | A * | 5/1980 | Williams | 464/60 |
| 4,986,441 | A * | 1/1991 | Kanbe et al. | 221/130 |
| 5,025,950 | A | 6/1991 | Trouteaud et al. | |
| 5,167,582 | A * | 12/1992 | Hunt | 464/78 |
| 5,509,573 | A | 4/1996 | Campoli | |
| 5,831,862 | A | 11/1998 | Hetrick et al. | |
| 6,253,954 | B1 * | 7/2001 | Yasaka | 221/93 |
| 6,286,715 | B1 * | 9/2001 | Ziesel et al. | 221/171 |
| 7,299,576 | B2 | 11/2007 | Martin et al. | |
| 7,383,099 | B2 | 6/2008 | Pollard et al. | |
| 7,584,868 | B2 | 9/2009 | Bauch et al. | |
| 7,809,470 | B2 * | 10/2010 | Shoenfeld | 700/243 |
| 7,950,817 | B2 | 5/2011 | Zulim et al. | |
| 8,082,061 | B2 | 12/2011 | Segal et al. | |
| 8,392,019 | B2 * | 3/2013 | Segal et al. | 700/242 |
| 2010/0103131 | A1 | 4/2010 | Segal et al. | |
| 2010/0262282 | A1 | 10/2010 | Segal et al. | |
| 2011/0054673 | A1 | 3/2011 | Segal et al. | |

* cited by examiner

*Primary Examiner* — Timothy Waggoner
(74) *Attorney, Agent, or Firm* — Kenneth S. Roberts; One LLP

(57) ABSTRACT

A vending arrangement for computerized vending machines, retail displays, automated retail stores, utilizes a centralized, robotic gantry associated with companion modules for vending a plurality of selectable products. The modularized design enables deployment of half-sized or larger, full sized machines. The robotic gantry is deployed in a centralized module disposed adjacent display and inventory modules. Inventory modules can be fitted to both gantry sides, and doors can be fitted to the gantry front or rear. The gantry comprises an internal, vertically displaceable elevator utilizing a central conveyor for laterally, horizontally moving selected items from associated display and inventory positions to a vending position. Computerized software enables the display and vending functions, and controls elevator movement to dispense products from twin sides of the gantry by appropriately controlling the conveyor.

19 Claims, 18 Drawing Sheets

DISPENSING MECHANISM FOR CENTRALIZED ROBOTIC GANTRY

CROSS-REFERENCE TO RELATED APPLICATION

This application is a continuation-in-part of U.S. application Ser. No. 12/806,862, filed Aug. 23, 2010 now U.S. Pat. No. 8,392,019, and entitled "Modular Vending With Centralized Robotic Gantry," which claims the benefit of U.S. Provisional Application Ser. No. 61/237,604, filed Aug. 27, 2009, which applications are incorporated herein by reference. This application also claims the benefit of U.S. Provisional Application Ser. No. 61/380,810, filed Sep. 8, 2010, and entitled "Dispensing Mechanism and Centralized Robotic Gantry", which is incorporated herein by reference.

BACKGROUND

1. Field

The present system relates generally to automated and modularized vending machines that can be custom deployed in diverse configurations. More specifically, the present system relates to automated vending systems utilizing an improved robotic dispensing module and associated inventory modules that can be assembled and configured to create diverse vending arrangements, with components linked together via a virtual integrated network.

2. Description of the Related Art

Numerous vending machines exist for selling or vending diverse products through an automated, or 'self-service' format. Vending reached popularity in the late 1800's with coin-operated devices dispensing diverse merchandise. More recently vending machines have evolved to include robotic dispensing components, and/or PCs and virtual interfaces. These new vending platforms have emerged in the marketplace under the popular descriptions "automated retail," "interactive retail," and/or "interactive retail displays." Such vending machines may be deployed within a variety of commercial or public settings. They typically include illuminated displays that seek to offer convenient purchasing.

In the vending arts, machines historically have a similar design and orientation that make them unable to easily change machine sizes and configurations, inventory storage sizes and product form factors without rebuilding or redesigning the machine. Typically machines are "one size fits all". There are some models of traditional vending machines that allow additional inventory areas to be added on, but these models do not utilize a robotic dispensing unit to move the product from the shelf to the collection area and rely on gravity (drop) systems. Because of the expense of robotic delivery systems and the configuration of these systems, these machines have been constrained to serving one user at a time through one side of the machine. In addition the machines come in a single size format and two machines have to be stacked adjacently to expand site capacity. In more modern robotic machines, the size of the machines tends to be larger than traditional vending machines and units cannot be reduced based on the robotic architecture and production of the machine. In all of these machines, the robotic dispensing system is built as a continuation of the inventory system and cannot be easily separated.

The present system introduces a preferred mechanism for dispensing items in a vending machine or automated retail store. It is preferably used in conjunction with an isolated and centralized robotic dispensing system that can support multiple inventory areas and technologies within those areas. The present system provides the ability to collect items delivered from a variety of inventory dispensing systems from multiple sides. It also provides the ability to deliver these collected items to users out of multiple sides of the machine allowing more than one person to simultaneously conduct transactions within the same machine, or to function with one or more inventory cabinets without any major modifications to the mechanism.

There is great value in having a common mechanism that can handle receiving merchandise from multiple inventory cabinets with various types of inventory tray dispensing mechanisms.

Being able to use multiple types of inventory tray mechanisms with a single dispensing system allows a greater range of possible inventory that can be dispensed. Specialized inventory trays can be customized to fit merchandise of varying form factors and still use the common centralized robotic dispensing system with reliability. This allows the machine to adapt and evolve over time without having to redesign the end dispensing system saving cost and development time.

These various inventory areas can be used with the same dispensing system allowing a great deal of flexibility in how the machine is configured. A machine can be composed of inventory elements, display units and a central dispensing area "strung together" enabling the machine footprint to grow/contract depending on environmental constraints. Inventory solutions can be updated and reconfigured to work with the central dispensing mechanism without significant customization of the dispensing mechanism, allowing for rapid accommodation of new types and amounts of merchandise for purchase or promotion.

This central dispensing system design allows greater reliability of dispensing by providing a uniform broader surface area (landing pad) for products to dispense. It also reduces axes of motion by 1 (e.g. X, Y, and Z reduces to Y and Z motion) by eliminating excess movement through inefficient placement of inventory and robotic components. Elimination of excess movement reduces potential points of failure and additional calibration and programming, in addition to increasing power efficiency and delivery speed. This design affords the ability to dispense out of multiple sides of the machine allowing more than one user to use the machine at the same time.

It is thus desirable to provide a method and mechanism that enables a wide range of inventory to be dispensed to a user with a common end dispensing system. It is also desirable to be able to isolate this mechanism in a standalone structure that can be attached to one or more inventory areas.

SUMMARY

The present system consists of a conveyor, product collection wings, elevator mechanism, and supports that make up a robotic gantry. In the present system's preferred configuration, it is connected to a series of physical merchandise displays, promotional/digital signage, automated mechanical/dispensing, and/or transactional modules that can be assembled and configured to create an automated retail store, vending unit, or interactive retail display of any size and link together via a virtual integrated network. The present system allows for a highly customizable vending machine of different sizes and configurations that can dispense a wide array of items all utilizing a common robotic dispensing module.

In accordance with one aspect of the present system, there is a robotic elevator operated by one or more motors that delivers a landing platform to meet items that are located in various inventories. The elevator positions itself at a close height proximity that prevents items from being damaged as they are dispensed from their holding area onto the robotic platform.

In accordance with another aspect of the present system, the platform consists of a conveyor that can rotate in either direction to move the collected item to a designated user collection area.

In accordance with another aspect of the present system, the conveyor delivers the item into a secure designated collection area that consists of a space to receive the dispensed items and a method to secure the internal dispensing mechanism in order to prevent tampering by a user, or injury to the user.

In accordance with another aspect of the present system, the inventory areas are attached to the centralized robotic dispensing mechanism. These inventory areas can vary in size to accommodate different product mixes but attach to the central robotic dispensing system in the same manner.

In accordance with another aspect of the present system, the display areas can vary in size, configuration and appearance to fit the products or items being merchandised.

This system and design improves the efficiency of dispensing items by allowing one or more inventory areas of various sizes to be attached to a centrally located and common robotic collection and dispensing system. Because of this design, there is no need for redundancy of expensive robotic components when increasing inventory size. By isolating the inventory retrieval and dispensing mechanism from the inventory storage area, a multitude of different inventory areas can be attached without the need to redesign this subcomponent when altering machine size or configuration. These inventory areas can employ various mechanisms that feed into the dispensing mechanism. These inventory areas can also alter to accommodate a wide range of items in quantity and size.

The present system provides a common robotic dispensing system to service more than one user in parallel. By providing an isolated and centrally located mechanism, multiple users can engage with a system simultaneously. Purchased items are queued based on time of transaction and dispensed accordingly. This provides a great advantage by removing the constraint of one user at a machine at one time. This is a pronounced advantage in crowded or popular venues, where queues may form in front of machines. The dual-sided machine allows for almost double the users to be serviced in the same amount of time by providing two portals for transaction and product dispensing within a single machine platform. It also enables greater flexibility in merchandising/designing the machine in that each side of the machine can take on a different look/feel, but be accessed by the same robotic mechanism.

The present system enables separation of the purchasing/transactional components of the vending platform with the dispensing components, allowing inventory and completion of the process to occur in a different location from the selection of merchandise and payment transaction. One such scenario: a physical space is inhabited by a central dispensing mechanism that attaches to adjacent inventory dispensing towers; users retrieve their purchases out of multiple sides of this mechanism after completing the transaction at screens. These screens can be integrated within this location or located remotely.

This new centralized robotic vending mechanism increases the flexibility in dispensing capability in product size, shape, and orientation. In addition, it decreases the axes of motion and potential points of error by creating a more efficient mechanism and process of dispense. As a result, the machine's size, capacity and shape can change without duplication of expensive robotic components. This design also allows multiple users to simultaneously purchase items in the machine at two different parallel locations at the machine, while utilizing the same robotic dispensing mechanism. This doubles the service capacity of the machine. This also establishes a modular machine assembly convention whereby the robotic dispensing mechanisms are housed in one distinct section of the machine (the totem) and the inventory sections are separate segments that can affix to the totem to expand or contract depending on space and business considerations, without necessitating redesign of the machine's hardware or software.

Objects of the present system are to provide a product vending machine, automated retail machine, or self-service machine where items are stored inside a secure area and delivered to a user upon a successful transaction in an automated manner.

A basic object is to provide an improved design for product dispensing that cost effectively increases versatility, efficiency, and reliability of the system. This includes, improved product containment systems to increase product storage capacity, ease and efficiency of product handling, dispensing, structural integrity, modularity, customization, shipping/assembly, access and loading of the machine.

Another basic object of the present system is to provide a more effective and flexible vending machine design that can be adapted for its deployment environment by reusing a common dispensing component.

The present system provides a system and method to efficiently configure and deploy a vending system that accomplishes the following:

a) To provide a system design that can efficiently and effectively dispense a wide range of items (various sizes, shapes and types) in an automated (self-service) platform.
b) To optimize the inventory storage space inside of an automated retail machine, vending machine or other type of self-service machine.
c) To optimize the configuration of the machine into one of several formats including half-size (single inventory tower+totem), dual-sided dispensing (two sides of the machine activated to dispense) and isolated display+totem (spreading merchandising components away from the storage and mechanical dispensing of the machine.
d) To provide a design for a single robotic dispensing system to support multiple iterations of inventory/storage systems in a flexible and easily configurable/alterable manner.
e) To provide a design for a single robotic dispensing system to support one or more inventory areas that can "plug into" or be built onto a secondary dispensing system.
f) To provide a design for a single robotic dispensing system that can support multiple configurations (size, shape, etc.) in an automated retail, vending or self-service system based on optimizing the machine for the venue, or merchandising program.
g) To provide a design for a single robotic system/machine platform to vend items out of multiple sides of a machine enabling more than one user to use the machine simultaneously.
h) To build a system that can efficiently and effectively allow more than one user to use a single automated retail store machine (or vending machine or self service machine) concurrently.

i) To provide a cost-effective system design that increases the efficiency of product delivery by opening multiple transaction portals in a machine that utilizes the same centralized mechanism.

j) To provide a system where a common robotic dispensing system can support multiple users in an automated retail store, or vending machine, or self-service machine.

k) To provide a system that isolates a robotic dispensing mechanism from the rest of an automated retail, vending or self-service machine so it can be used with a variety of inventory configurations.

l) To design a system that allows for a larger envelope of products to dispense in the same area, by increasing the surface area for products to dispense and decreasing physical barriers (probable jam locations) within the dispensing mechanism.

m) To design a system that reduces the number of potential moves or axes of motion (e.g. reduces robotic movement to Y and Z vs. X, Y and Z motion) that a product and or robot need to make in order to dispense an object in a self-service, vending, and/or automated retail platform utilizing robotic technology.

n) To design a system that reduces the distance of robotic movement needed to dispense an object in a self-service, vending, and/or automated retail platform utilizing robotic technology.

o) To design a system that utilizes inventory "zones" where multiple inventory technologies can be leveraged to dispense an item to a central robotic dispensing mechanism.

p) To design a central dispensing mechanism that perceptually distances automated retail and self-service from existing vending technologies.

q) To design an independent dispensing mechanism that is contained in a smaller area of a machine in order to independently ship and assemble the inventory and robotic/dispensing components of a system for greater efficiency in deployment.

r) To design a centralized dispensing mechanism that is less subject to the forces of torque/structure across a machine by consolidation of mechanism in a "central core".

s) To design a centralized dispensing mechanism that uses two supports instead of four in an elevator structure to better compensate for torque caused by unlevel surfaces on which the machine rests.

t) To eliminate one axis of movement in a robotic dispensing mechanism in an automated retail/self-service machine.

u) To design a centralized dispensing mechanism in order to enable peripheral merchandising capabilities (displaying merchandise on both sides of a customer) when they are shopping at an automated retail machine's touch screen, or transaction portal.

v) To design a vending, or automated retail machine that allows co-branding (2 distinct branded wings/sides and 2 distinct branded faces—two fronts) to exist within the same machine as created by a modularized store (delineation of display) and dual-sided dispensing capability driven by a centralized robotic design.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

For purposes of disclosure, the following co-pending U.S. utility applications, which are owned by the same assignee as in this case, are hereby incorporated by references, as if fully set forth herein:

(a) Pending U.S. utility application Ser. No. 12/589,277, entitled "Interactive and 3-D Multi-Sensor Touch Selection Interface For an Automated Retail Store, Vending Machine, Digital Sign, or Retail Display," filed Oct. 21, 2009, by coinventors Mara Segal, Darrell Mockus, and Russell Greenberg, that was based upon a prior pending U.S. Provisional Application Ser. No. 61/107,829, filed Oct. 23, 2008, and entitled "Interactive and 3-D Multi-Sensor Touch Selection Interface for an Automated Retail Store, Vending Machine, Digital Sign, or Retail Display";

(b) Pending U.S. utility application Ser. No. 12/589,164, entitled "Vending Machines With Lighting Interactivity And Item-Based Lighting Systems For Retail Display And Automated Retail Stores," filed Oct. 19, 2009 by coinventors Mara Segal, Darrell Mockus, and Russell Greenberg, that was based upon a prior pending U.S. Provisional Application Ser. No. 61/106,952, filed Oct. 20, 2008, and entitled "Lighting Interactivity And Item-Based Lighting Systems In Retail Display, Automated Retail Stores And Vending Machines," by the same coinventors; and, (c) Pending U.S. utility application Ser. No. 12/798,803, entitled "Customer Retention System and Process in a Vending Unit, Retail Display or Automated Retail Store" filed Apr. 12, 2010, by coinventors Mara Segal, Darrell Mockus, and Russell Greenberg, that was based upon a prior pending U.S. Provisional Application Ser. No. 61/168,838 filed Apr. 13, 2009, and entitled "Customer Retention System And Automated Retail Store (Kiosk, Vending Unit, Automated Retail Display And Point-Of-Sale)", by coinventors Darrell Scott Mockus, Mara Segal and Russell Greenberg.

(d) Pending U.S. utility application Ser. No. 12/806,862, entitled "Modular Vending with Centralized Robotic Gantry" filed Aug. 23, 2010, by coinventors Darrell Mockus, Mara Segal, and Russell Greenberg, that was based upon a prior pending U.S. Provisional Application Ser. No. 61/237,604 filed Aug. 27, 2009, and entitled "System And Method For Dispensing Items In An Automated Retail Store Or Other Self-Service System (Including Vending And Self-Service Check-Out Or Kiosk Platforms)": by co-inventors Darrell Scott Mockus, Mara Segal and Russell Greenberg, and priority based on said application is claimed.

Figure 1A:
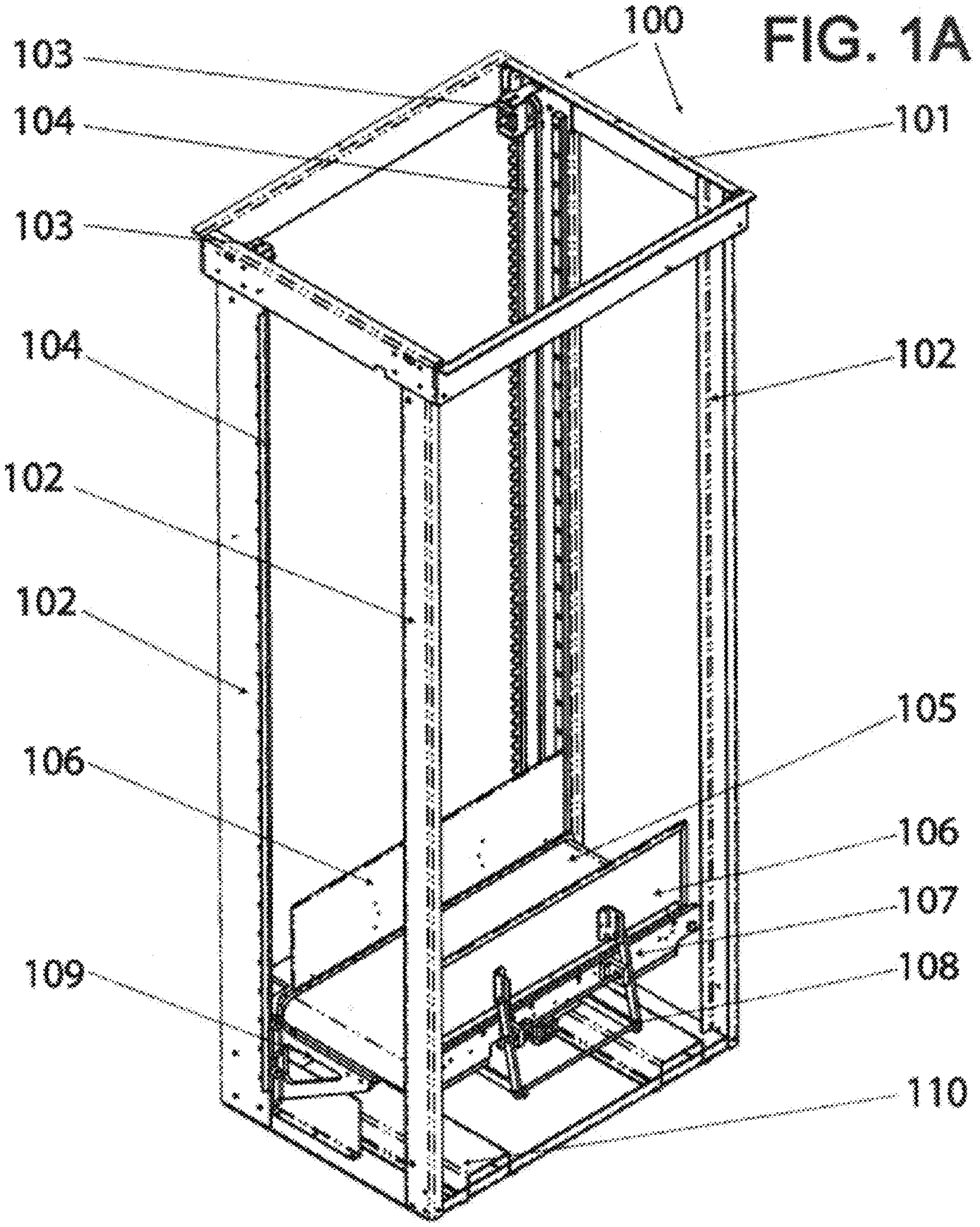
FIG. 1A is an isometric assembly view of a preferred robotic gantry module used with the vending machines of the present system, with portions thereof omitted for clarity and brevity.
Figure 1B:
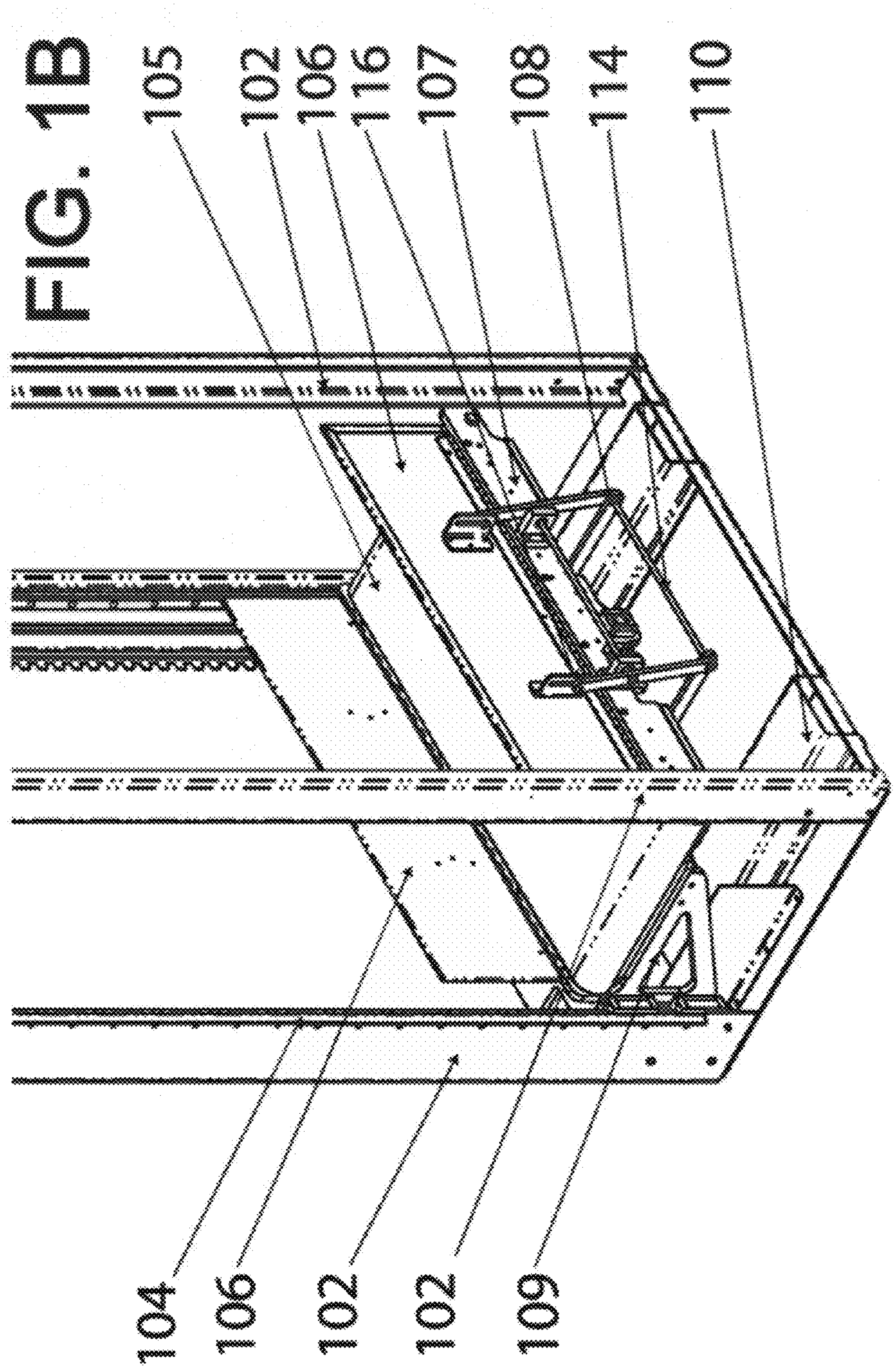
FIG. 1B is a fragmentary isometric view that enlarges the bottom portion of FIG. 1A.
Figure 1C:
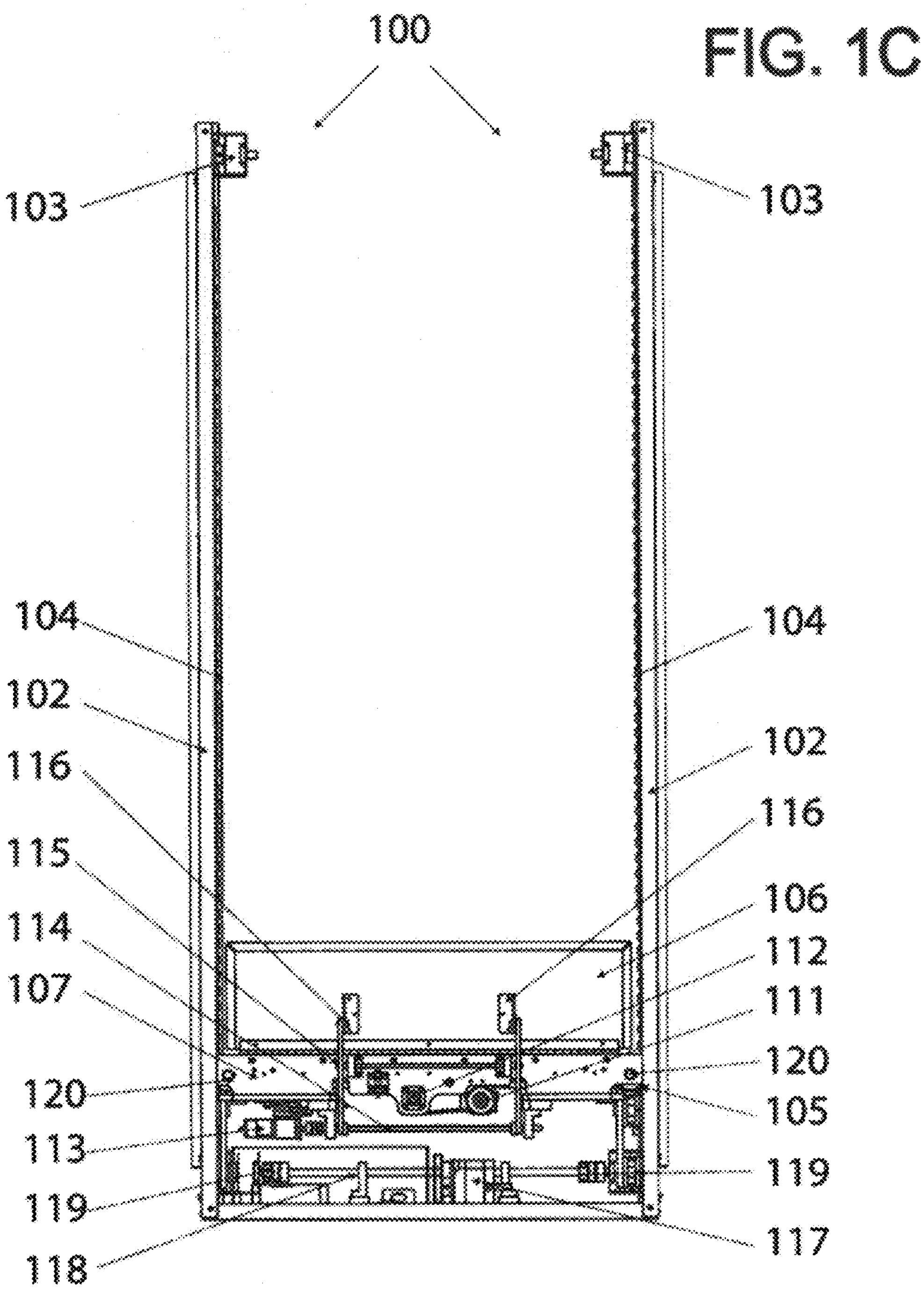
FIG. 1C is a longitudinal sectional view of the preferred robotic gantry module used with the vending machines of the present system showing components hidden in FIG. 1A.
Figure 1D:
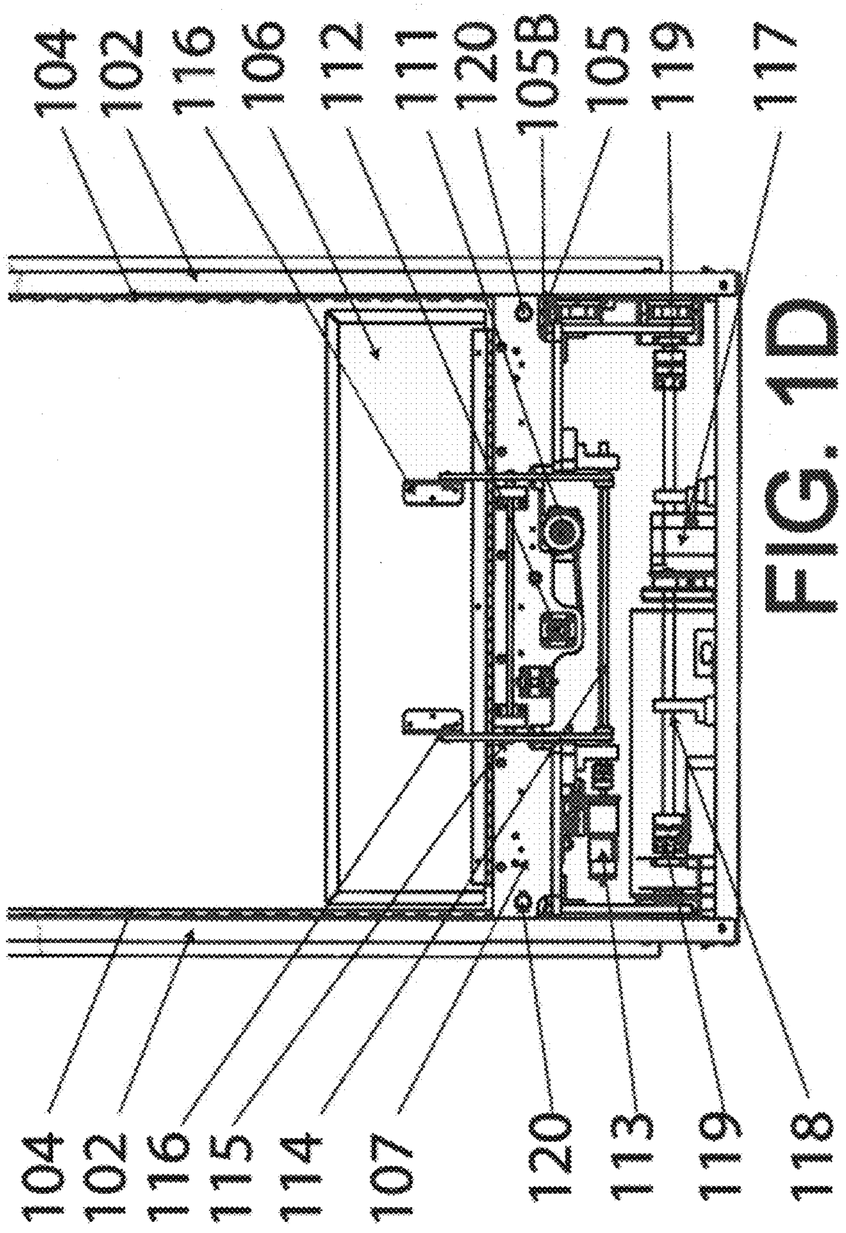
FIG. 1D is a fragmentary sectional view that enlarges the bottom portion of FIG. 1C.
Figure 1E:
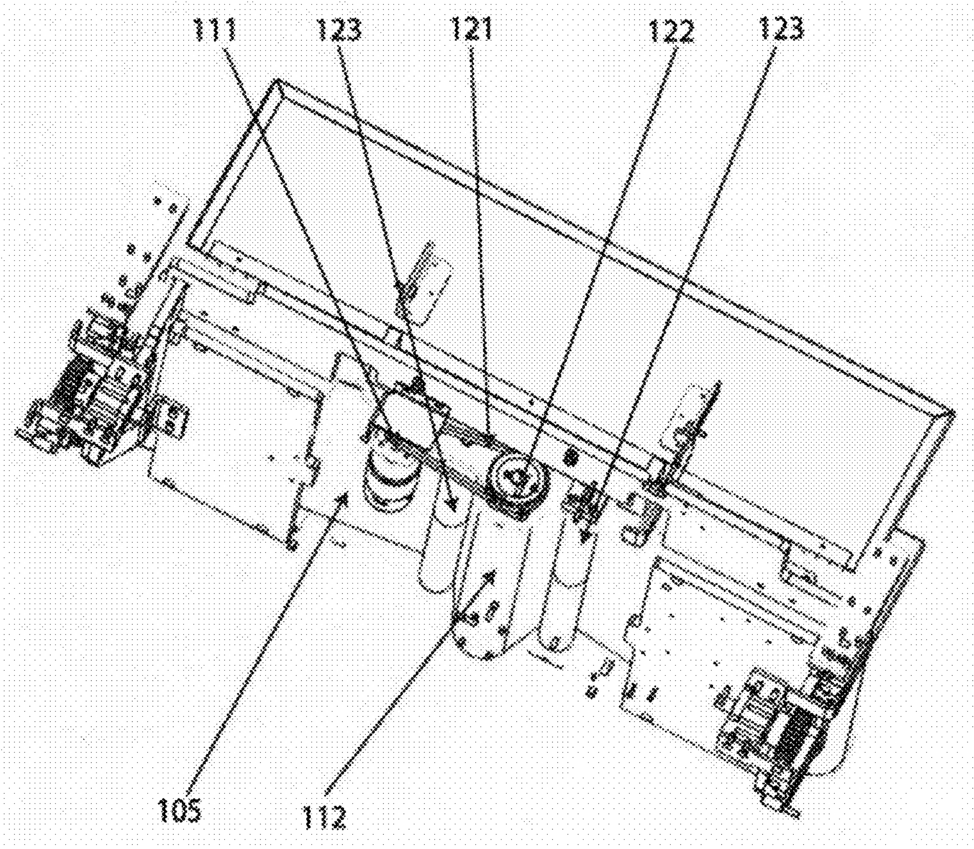
FIG. 1E is a fragmentary sectional view that highlights the mechanisms that drive the conveyor belt.
Figure 2A:
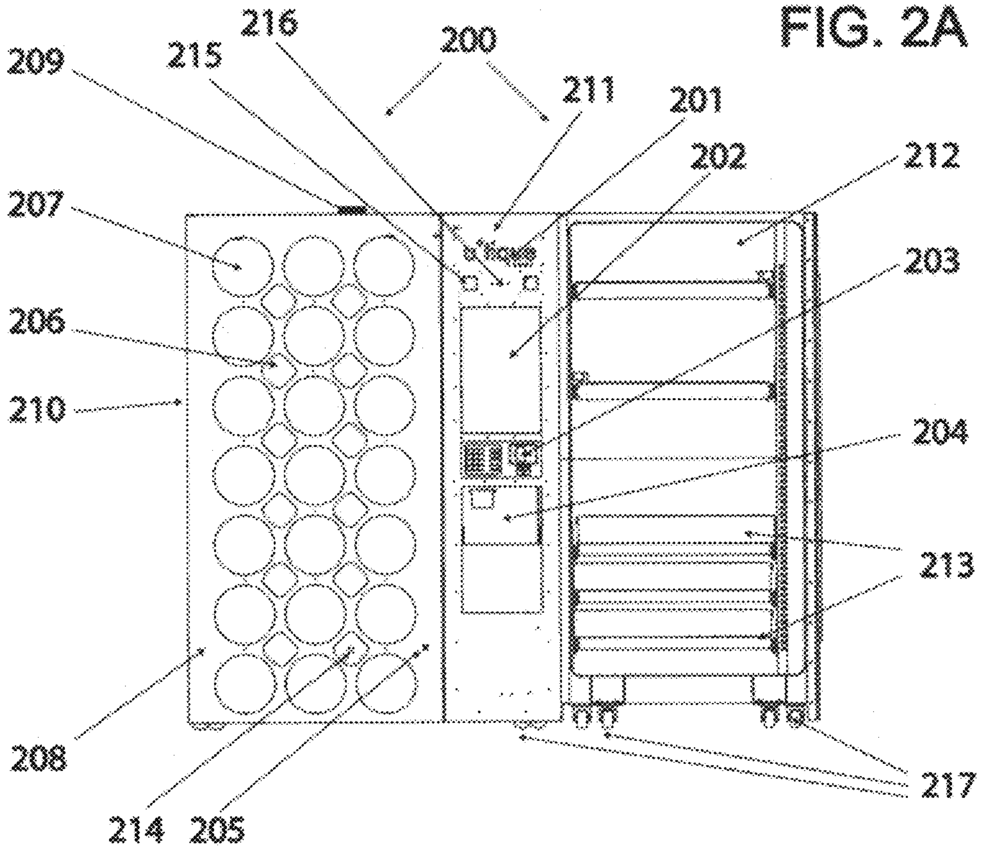
FIG. 2A is front elevational view of a modular vending machine assembly with a two connected inventory modules.
Figure 2B:
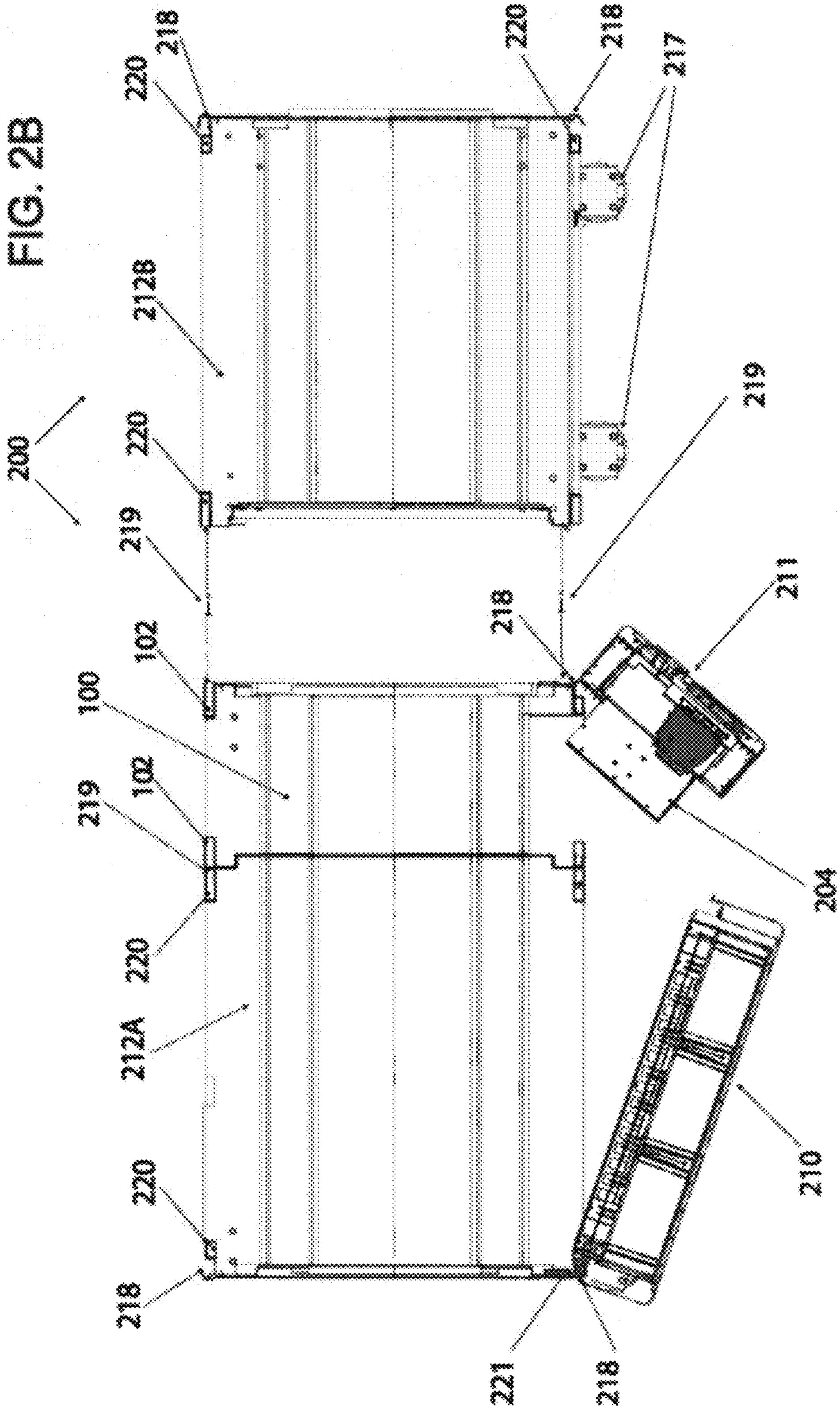
FIG. 2B is a top view of a vending machine assembly illustrating the connection of the various components.

With initial reference directed to FIGS. 1A-1E of the appended drawings, a robotized gantry 100 is adapted to be integrated into a multiple-module vending machine or automated retail store (see vending machine 200, FIGS. 2A and 2B). Gantry 100 comprises a rigid, upright frame consisting of an upper square portion 101, supported by vertical upright C-Channel support beams 102 attached to a gantry base 110. An internal elevator comprises a transverse conveyor 105 resting upon an elevator conveyor tray 107 within the gantry 100. Conveyor 105 comprises a flexible sheet looped and entrained about a pair of spaced apart rollers 105B that are journalled in the frame at 120 (FIG. 1D). The elevator is supported by two brackets 109 disposed on opposite ends of conveyor tray 107. The elevator, and thus conveyor 105 and tray 107 can be raised or lowered using pulleys 103 (FIG. 1A) that are attached atop the vertical support beams 102 and which entrain 9 mm wide and 3605 mm long belts 104.

Preferably conveyor tray 107 has a pair of retractable, product collection wings 106 that open in response to wing hinge assembly 108 when the elevator is in place to collect items that are dispensed from inventory area(s) in modules placed on either side of the dispensing gantry 100. Wings 106 span the distance between the conveyor and the inventory shelves caused by the necessary existence of the frame structure to support the conveyor elevator.

FIGS. 1C and 1D clarify how gantry components are driven. The conveyor belt 105 is driven by a conveyor stepper motor 111 that uses a 9 mm. wide belt 121 (FIG. 1E) to power a drive pulley connected to a roller bar 112 and feeds the conveyor belt around the conveyor rollers 105B that are journalled at 120. The flexible conveyor fabric is wrapped around the conveyor drive roller 112 and the rollers 105B.

The generally rectangular product collection wings 106 are disposed on either side of the conveyor 105 to direct selected products upon the conveyor to vend. The retractable wings 106 are actuated by the wing motor 113 (514 FIG. 5) connected to the wing hinge assembly 108 (FIG. 1A) which comprises a wing drive shaft (124 FIG. 1F) that distributes power from the motor to a series of levers 114 and 115 that are connected to hinges 116 secured to the product collection wings 106. As the motor turns from the closed position, the support levers 115 are pulled downwardly, causing the upper portion of the levers 115 to slide within stabilizer follower slots (FIG. 1B) in hinges 116. This opens the collection wings 106 to a predetermined width that allows the conveyor 105 to collect products from inventory areas attached to either side of the central gantry dispensing assembly 100. The motor can be reversed to close the product collection wings.

The elevator motor 117 (507 FIG. 5) is connected to a pulley wheel and uses a 9 mm. wide belt to drive the elevator drive shaft 118 turning two pulleys 129 mounted on either side of the subassembly that drives the elevator belt 104 which loops around the top pulleys 103 thereby raising or lowering the elevator. After a product is collected from the inventory shelf, the elevator is aligned with the collection area compartment behind the collection area opening 204 (FIG. 2A) in the totem door 211 (FIG. 2A).

FIG. 1E provides additional reference for FIGS. 1A through 1D in relation to the mechanisms that drive the conveyor belt in the robotic gantry. Parts and components have been removed for clarity. In this view, the belt 121 that drives the pulley 122 connected to roller bar 112 is illustrated. The conveyor 105 is threaded under roller bar 112 and over auxiliary roller bars 123.

Figure 1F:
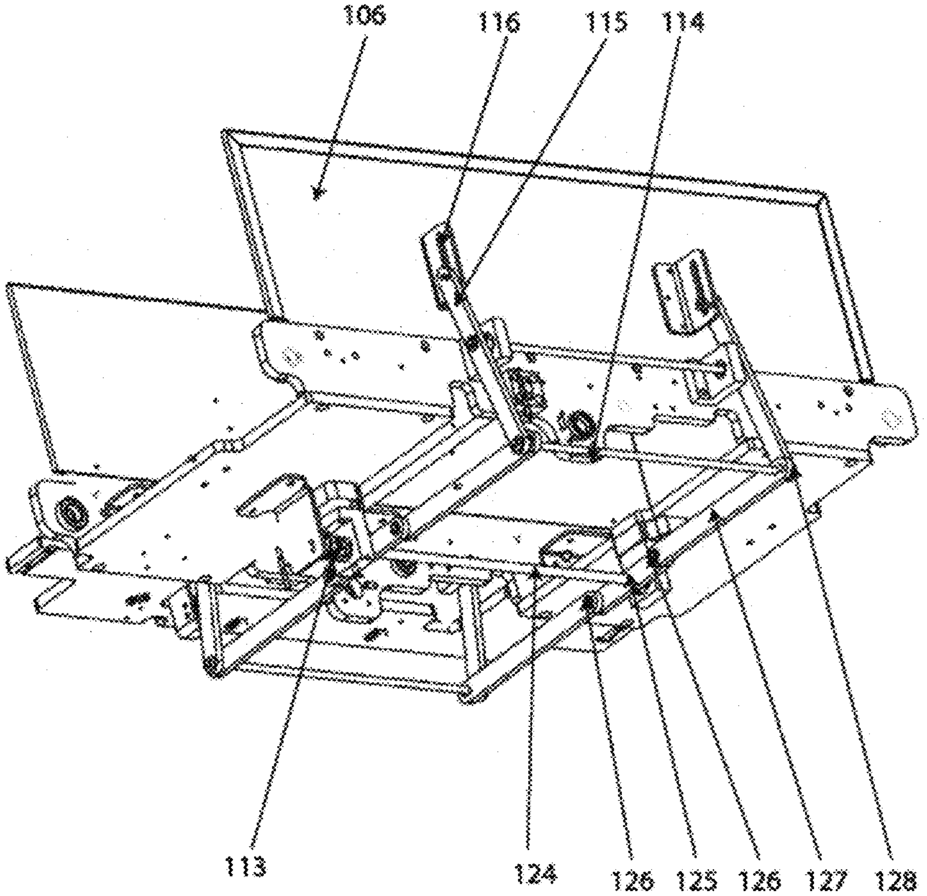
FIG. 1F is a fragmentary sectional view that highlights the mechanisms that operate the product collection wings.

FIG. 1F provides additional reference for FIGS. 1A through 1D in relation to the mechanisms that operate the product collection wings 106 in the robotic gantry. Parts and components have been removed for clarity. When motor 113 is actuated from a closed position, drive shaft 124 rotates causing levers 125 to rotate. This causes levers 127 that are connected to levers 125 to contract because of their connection to hinges 126. These levers are connected to lever 115 at point 128 pulling down forcing the lever connection point to slide in the slot in hinge 116. Crossbar 114 keeps the power distribution even. When the motor is reversed back to the starting position, the levers move in the opposite direction causing the product collection wings 106 to close.

Figure 1G:
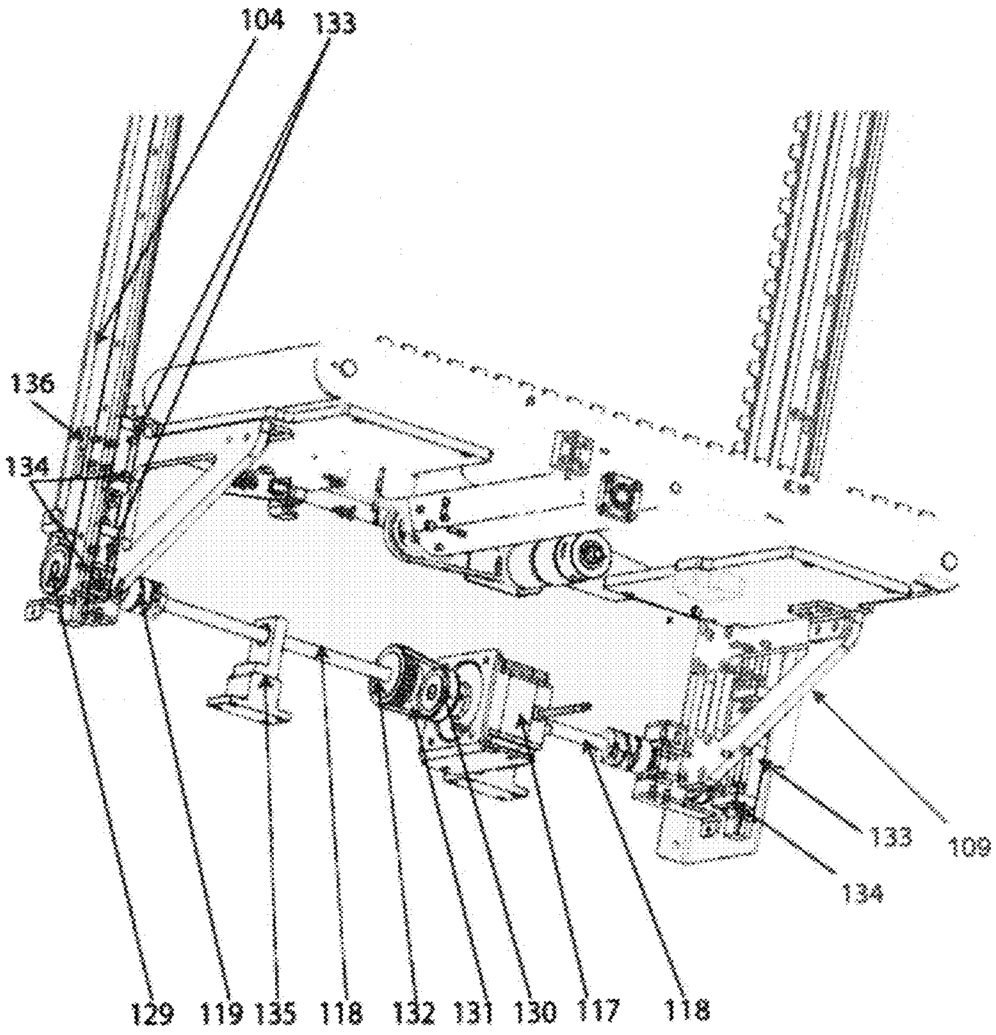
FIG. 1G is a fragmentary sectional view that highlights the mechanisms that drive the elevator.

FIG. 1G provides additional reference for FIGS. 1A through 1D in relation to the mechanisms that operate the elevator in the robotic gantry. Parts and components have been removed for clarity. Motor 117 is connected to pulley 130 which drives belt 131 connected to pulley 132. Pulley 132 is affixed with two set screws driven into flat spots on elevator drive shaft 118. A support 135 provides additional shaft support between the couplers. The shaft is connected at either end to couplers 119 that deliver power to the belt pulley mechanisms 129. The couplers 119 each have two flex points that allow the gantry to compensate for any torque on the assembly. The couplers 119 are helical beam couplings that each have two sets of spiral slots, a feature that provides compensation for parallel misalignment, angular misalignment or axial motion issues by flexing to these forces while maintaining a connection on both ends without compromising the coupler integrity. This way, the machine will continue to operate even if the drive shaft gets pulled out of alignment due to natural forces attributed to the installation environment or through warping due to age and wear. This feature greatly increases the mechanism's ability to perform under structure strain and natural wear. Both ends of the elevator belt 104 are attached to clamp 136. There is one clamp on each side of the gantry (only one side is visible in the diagram). These clamps are attached to supports 134. This clamp pinches the ends each belt 104 and causes the gantry to be attached to a fixed point on the belt. As the pulley assemblies drive the elevator belt in either direction, the gantry raises or lowers the entire elevator assembly accordingly. Supports 109 keep the elevator platform level. The elevator tray has a hinge coupler support 133 that consists of a pin and a series of rubber O-rings that fit inside a shaft. This mechanism allows the tray to have some flexibility to compensate for irregular weight distribution of heavy products and natural torque that can occur because of the installation location of the machine and wear and tear on the components that will occur over time. This feature is assisted by the design where the supports only connect on one side of the gantry allowing for additional stress on the frame to occur without impeding the elevator. There is great advantage to having this flexibility built into the gantry mechanism as the inability to compensate for these common forces in automated retailing installations can cause the dispensing mechanism to fail. The alternative of providing a very rigid support structure is cost prohibitive and can add significant weight to the machine that in turn causes logistic issues.

With additional reference directed to FIGS. 2A and 2B, a vending machine constructed in accordance with the best mode of the invention has been generally designated by the reference numeral 200 (FIG. 2A). Much of the hardware details are explained in the aforementioned pending applications that have been incorporated by reference herein. Display module 210 can be attached with a hinge to an inventory area covered by control panel 211, comprised of a rigid upright cabinet, or the module 210 can be mounted to a solid structure as a stand-alone retail display. The display module 210 forms a door hinged to an adjacent cabinet such as an inventory cabinet 212A adjacent gantry 100 that is covered by control column 211.

A variety of door configurations known in the art can be employed. For example, the display doors can be smaller or larger, and they can be located on one or both sides of the control column 211. The display doors can have multiple square, oval, circular, diamond-shaped, rectangular or any other geometrically shaped windows. Alternatively, the display area can have one large display window with shelves inside.

A customizable, lighted logo area 201 (FIG. 2A) is disposed at the top of column 211. Touch screen display 202 is located below area 201. Panel 203 locates the machine payment system, coin acceptor machine or the like. Additionally panel 203 can secure a receipt printer, keypad, headphone jack, fingerprint scanner or other access device. The product retrieval area 204 is disposed beneath the console 211 in a conventional collection area compartment (not shown). A key lock 205, which can be mechanical or electrical such as a punch-key lock, is disposed beneath the face of the module 210. One or more motion sensors 214 are disposed within smaller display tubes within the console interior. A plurality of generally circular product viewing areas 207 and a plurality of generally diamond shaped viewing areas 206 are defined upon the outer the face of the casing 208 that are aligned with internal display tubes behind the product viewing surface areas, though the shape of the viewing areas may alter with various merchandising concepts. However, the convention of framing merchandising offerings is consistent to enable intuitive interfacing whether a physical or virtual representation of the merchandise display. The reference numeral 209 designates an exterior antenna that connects to a wireless modem inside the machine providing connectivity. 213 shows inventory shelves which may be mounted in the inventory cabinet 212. These inventory shelves may contain any mechanism such as conveyors or spiral vending systems as long as they can push a product off the edge of the inventory tray.

Speakers 215 are mounted in the column 211. A camera 216 capable of capturing video and still images is also mounted in the column 211. The machine components are set on casters 217 with feet that can be retracted for moving or lowered to position a machine in a deployed location.

FIG. 2B shows a standard configuration of the assembly. The robotized modular gantry 100 is shown connected to an inventory cabinet 212A by bolting the upright C-Channel structures 102 of the modular gantry 100 to upright C-Channel beams 219 which are then affixed to the upright C-Channel structures 220 of the inventory cabinet using additional bolts. Power and controls are routed to the modular gantry via a wiring harness (not depicted) located on the bottom of the modular gantry. The CPU and power supplies (detailed in FIGS. 4 and 5) are located in the bottom of the main inventory cabinet that is attached to a modular gantry. A second inventory cabinet 2128 can also be attached to the other side of the robotized modular gantry 100 using the same method of bolting the upright supports of the inventory cabinets 220 and the upright supports of the gantry 102 to a common upright C-Channel support 219. Power and control cables for the additional inventory system modules and power and control cables for the additional lighting modules can be connected via cables with standard connectors (not pictured).

Display doors 210 can be attached to the inventory cabinets via a piano hinge 218 running the full height of the door. The necessary electrical and control wiring connects via a wiring harness 221 located on the interior of the inventory cabinet near the hinge connection. These piano style hinges are located on the exterior corners of the inventory cabinets. They are covered with simple metal paneling if they are not in use. The totem doors 211 are attached in a similar manner using a piano hinge 218. The necessary electrical and control wiring connect to a wiring harness located in the interior of the totem door (wiring harness not depicted).

Figure 3:
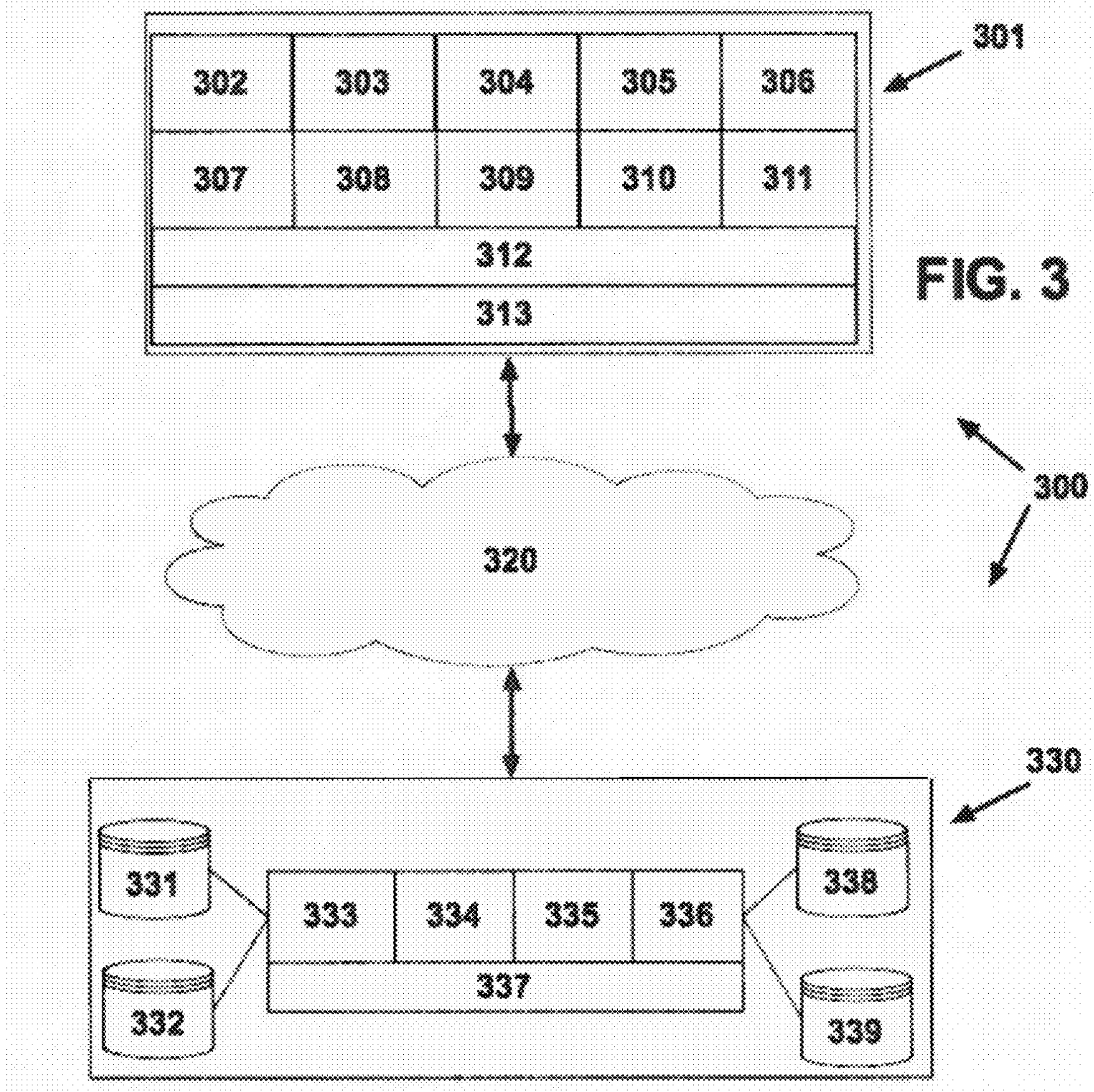
FIG. 3 is a generalized block diagram of the preferred software of the system.

With primary reference directed to FIG. 3, a system consisting of a plurality of automated retail machines connected via a data connection to a centralized, backend operations center system has been designated by the reference numeral 300. At least one automated retail machine 301 is deployed in a physical environment accessible by a consumer who can interact with the machine 301 directly. There can be any number of machines 301, all connected to a single, remote logical operations center 330 via the Internet 320 (or a private network). The operations center 330 can physically reside in a number of locations to meet redundancy and scaling requirements.

The machine software is composed of a number of segments that all work in concert to provide an integrated system. Logical area 302 provides the interface to deal with all of the machine's peripherals such as sensors, keypads, printers and touch screen. Area 303 handles the monitoring of the machine and the notifications the machine provides to administrative users when their attention is required. Area 304 controls the reporting and logging on the machine. All events on the machine are logged and recorded so they can be analyzed later for marketing, sales and troubleshooting analysis. Logical area 305 is responsible for handling the machine's lighting controls.

Logical area 306 is the Inventory Management application. It allows administrative users on location to manage the inventory. This includes restocking the machine with replacement merchandise and changing the merchandise that is sold inside the machine. Administrative users can set the location of stored merchandise and the quantity.

Logical area 307 is the retail store application. It is the primary area that consumers use to interface with the system.

Logical area 308 handles the controls required to physically dispense items that are purchased on the machine or physically dispense samples that are requested by a consumer. This area reads the data files that tell the machine how many and what types of inventory systems are connected to the machine. Logical area 309 controls the inventory management system allowing authorized administrative users to configure and manage the physical inventory in the machine. Area 310 controls the payment processing on the machine. It manages the communication from the machine to external systems that authorize and process payments made on the machine. Area 311 is an administrative system that allows an authorized user to manage the content on the machine. This logical area handles the virtual administrative user interface described previously. The content can consist of text, images, video and any configuration files that determine the user's interaction with the machine.

The latter applications interface with the system through an application layer designated in FIG. 3 by the reference numeral 312. This application layer 312 handles the communication between all of these routines and the computer's operating system 313. Layer 312 provides security and lower level messaging capabilities. It also provides stability in monitoring the processes, ensuring they are active and properly functioning. Logical area 331 is the user database repository that resides in the operations center 330. This repository is responsible for storing all of the registered user data that is described in the following figures. It is logically a single repository but physically can represent numerous hardware machines that run an integrated database. The campaign and promotions database and repository 332 stores all of the sales, promotions, specials, campaigns and deals that are executed on the system. Both of these databases directly interface with the real-time management system 333 that handles real-time requests described in later figures. Logical area 334 aggregates data across all of the databases and data repositories to perform inventory and sales reporting. The marketing management system 335 is used by administrative marketing personnel to manage the marketing messaging that occurs on the system; messages are deployed either to machines or to any e-commerce or digital portals. Logical area 336 monitors the deployed machines described in FIG. 2, and provides the tools to observe current status, troubleshoot errors and make remote fixes. Logical area 337 represents the general user interface portion of the system. This area has web tools that allow users to manage their profiles and purchase products, items and services. The content repository database 338 contains all of the content displayed on the machines and in the web portal. Logical area 339 is an aggregate of current and historical sales and usage databases comprised of the logs and reports produced by all of the machines in the field and the web portals.

Figure 4:
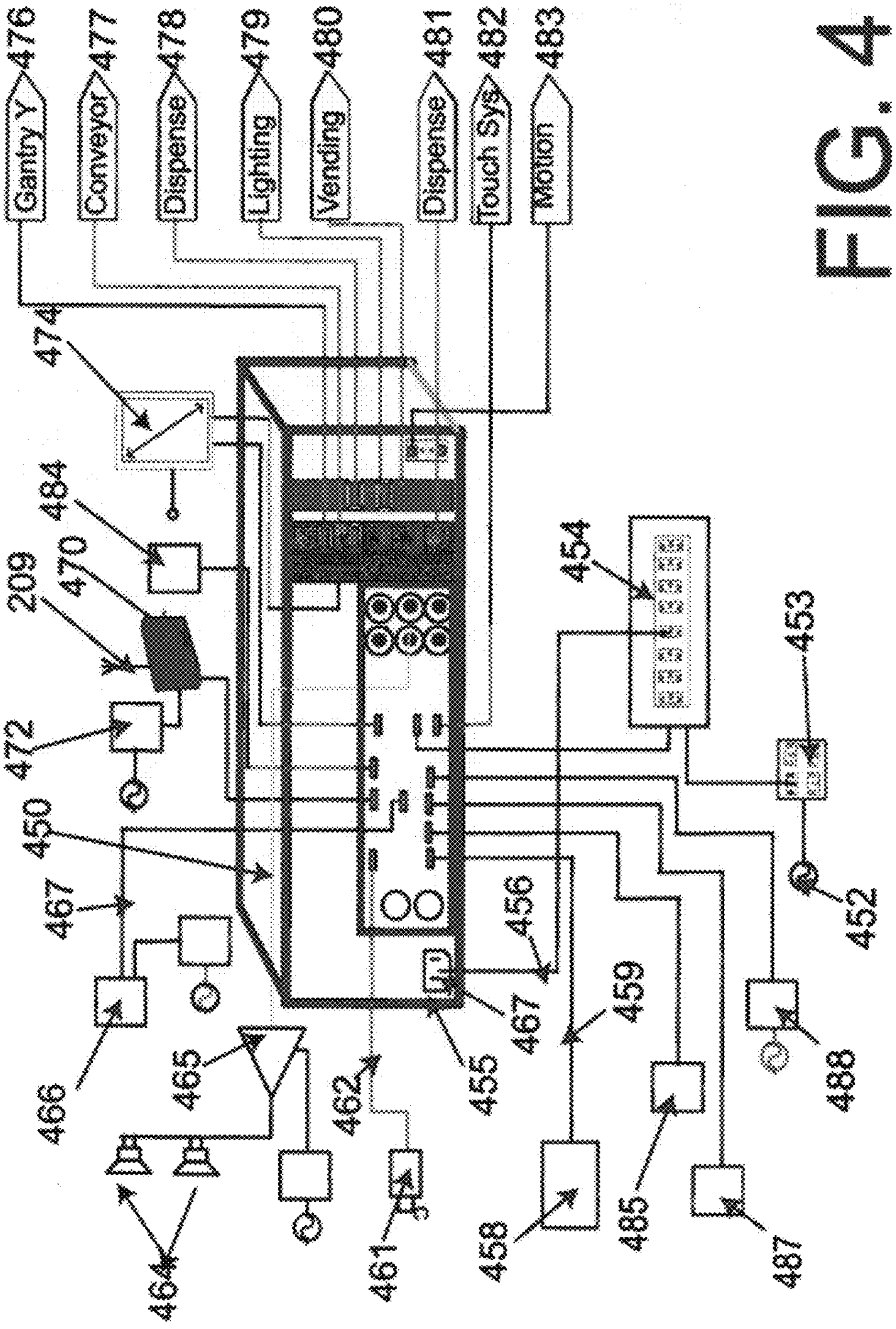
FIG. 4 is a diagrammatic view showing the preferred interconnection of the system computer and communication hardware.
Figure 5:
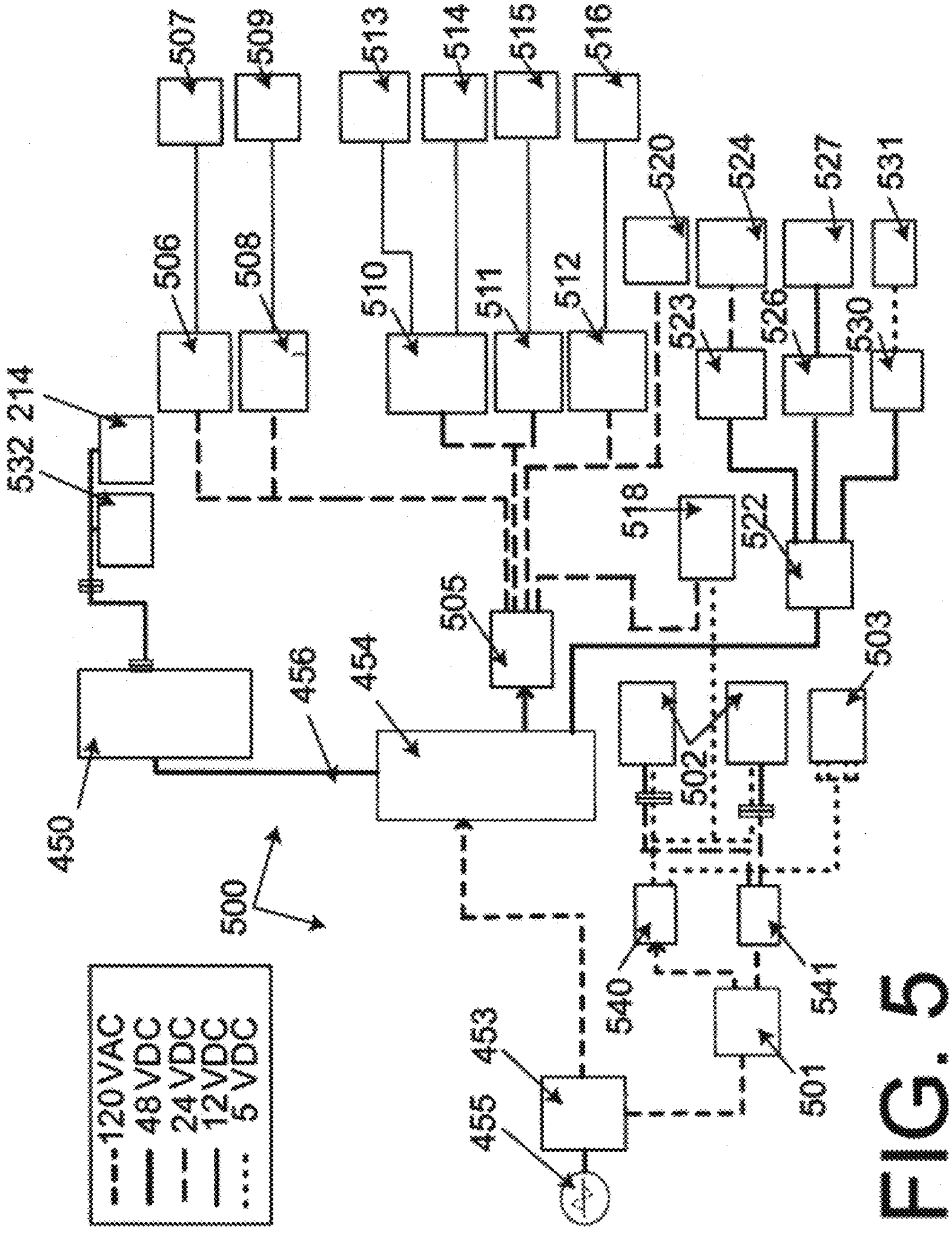
FIG. 5 is a block diagram of the preferred electrical power supply arrangement.

FIGS. 4 and 5 illustrate system wiring to interconnect with a computer 450 such as Advantech's computer engine with a 3 Ghz CPU, 1 GB of RAM memory, 320 GB 7200 RPM hard disk drive, twelve USB ports, at least one Serial port, and an audio output and microphone input. The computer 450 (FIGS. 4 and 5) communicates to the lighting system network controller via line 479. Through these connections, the lighting system is integrated to the rest of system. Power is supplied through a plug 452 that powers an outlet 453, which in turn powers a UPS 454 such as TripLite's UPS (900 W, 15 VA) (part number Smart1500LCD) that conditions source power, which is applied to input 455 via line 456. Power is available to accessories through outlet 453 and UPS 454.

Computer 450 (FIG. 4) is interconnected with a conventional payment reader 458 via cabling 459. A pin pad 485 such as Sagem Denmark INT1315-4240 is connected to the CPU 450 via a USB cable. An optional web-accessing camera 461 such as a LOGITECH webcam (part number 961398-0403) connects to computer 450 via cabling 462. Audio is provided by transducers 464 such as Happ Controls four-inch speakers (part number 49-0228-00R) driven by audio amplifier 465 such a Happ Controls Kiosk 2-Channel Amplifier with enclosure (part number 49-5140-100) with approximately 8 Watts RMS per channel at 10% THD with an audio input though a 3.5 mm. stereo jack connected to computer 450. A receipt printer 466 such as Epson's EU-T300 Thermal Printer connects to the computer 450 via cabling 467. The printer is powered by a low voltage power supply such as Epson's 24 VDC power supply (part number PS-180). A remote connection with the computer 450 is enabled by a cellular link 470 such as Multitech's Verizon CDMA cellular modem (part number MTCBA-C-IP-N3-NAM) powered by low voltage power supply 472. The cellular link 470 is connected to an exterior antenna 209. A touch enabled liquid crystal display 474 such as a Ceronix 22" Widescreen (16:10) Touch Monitor for computer operation also connects to computer 450. A Bluetooth adapter 487 such as D-Link's DBT-120 Wireless Bluetooth 2.0 USB Adapter is attached to the CPU allowing it to send and receive Bluetooth communication. A wireless router 488 such as Cisco-Linksys' WRT610N Simultaneous Dual-N Band Wireless Router is connected to the CPU to allow users to connect to the machine via a private network created by the router.

Digital connections are seen on the right of FIG. 4. Gantry-Y (conveyor elevator), stepper motor controller such as the Arcus Advanced Motion Driver+Controller USB/RS485 (part number Arcus ACE-SDE) connection is designated by the reference numerals 476. 477 connects to the conveyor motor controller which can also be something similar to an Arcus Advanced Motion Driver+Controller USB/RS485 (part number Arcus ACE-SDE). Dispenser control output is designated by the reference numeral 478 which operates the product collection wings motor 113 (FIG. 1B). The LED lighting control signals communicate through USB cabling to a DMX controller 479 that transmits digital lighting control signals in the RS-485 protocol to the display tube lighting circuit board arrays. An ENTTEC-brand, model DMX USB Pro 512 I/F controller is suitable. Cabling 480 leads to vending control. One or more inventory systems can be connected to the vending control depending on the configuration. Dispenser door control is effectuated via cabling 481. Façade touch sensor inputs arrive through interconnection 482. Motion sensor inputs from a motion sensor such as Digi's Watchport/D (part number Watchport/D 301-1146-01) are received through connection 483. A USB connection connects the product weight sensor 484 such as Sartorius (part number FF03 VF3959) that is located in the collection area to determine the presence of a dispensed item.

FIG. 5 illustrates a detailed power distribution arrangement 500. Because of the various components needed, power has to be converted to different voltages and currents throughout the entire system. The system is wired so that it can run from standard 110 V.A.C. power used in North America. It can be converted to run from 220 V.A.C. for deployments where necessary. Power from line-in 455 supplied through plug 452 (FIG. 4) powers a main junction box 453 with multiple outlets (FIGS. 4, 5) that powers UPS 454 which conditions source power, and outputs to computer 450 line 456. Power is available to accessories through main junction box 453 and Ground-fault current interrupt AC line-in 455. An additional AC outlet strip 501 such as Triplite's six position power strip (part number TLM606NC) powers LED lighting circuits 502 and a touch system 503. Power is first converted to 5 volts to run the lighting board logic using a converter 540. Another converter, 541, converts the AC into 24 Volt power to run the lights and touch system.

An open frame power supply 505 (FIG. 5) provides 24 VDC, 6.3 A, at 150 watts. Power supply 505 powers Y-controller 506 such as the Arcus Advanced Motion Driver+Controller USB/RS485 (part number Arcus ACE-SDE), that connects to Y axis stepper motor 507 (117 FIGS. 1C & 1D). A suitable stepper 507 can be a Moons-brand stepper motor (part number Moons P/N 24HS5403-01N). Power supply 505 also connects to a conveyor controller 508, which can be an Arcus-brand Advanced Motion Driver+Controller USB/RS485 (part number Arcus ACE-SDE), that connects to a conveyor stepper 509 (111 in FIG. 1C and FIG. 1D). A Moons-brand stepper motor (part number Moons P/N 24HS5403-01N) is suitable for stepper 509.

Power supply 505 (FIG. 5) also powers dispenser controller 510, dispenser door control 511, and vending controller 512. Controller 510 powers collection wing motor 514 (113 FIGS. 1C and 1D) and door motor 515. Motors 514 and 515 can be Canon-brand DC gear motors (part number 05S026-DG16). Controller 512 operates conveyor motors 516 such as Micro-Drives DC Gear Motor (Part Number M32P0264YSGT4). The logo space 201 (FIG. 2) is illuminated by lighting 518 (FIG. 5) powered by supply 505. Supply 505 also powers LCD touch screen block 520 (FIG. 5) such as a Kristel 22" Widescreen (16:10) LCD Touch Monitor with USB connection for the touch panel. UPS 454 (FIG. 5) also powers an AC outlet strip 522 that in turn powers a receipt printer power supply 523 such as Epson's 24 VDC power supply (part number PS-180) that energizes receipt printer 524 such as Epson's EU-T300 Thermal Printer, an audio power supply that powers audio amplifier 527 such a Happ Controls Kiosk 2-Channel Amplifier with enclosure (part number 49-5140-100), and a low voltage cell modem power supply 530 that runs cellular modem 531 such as Multitech's Verizon CDMA cellular modem (part number MTCBA-C-IP-N3-NAM). A proximity sensor 214 (FIG. 2) such as a Digi Watchport/D part number 301-1146-01 is connected to the CPU 450. 532 is a door sensor and actuator such as Hamlin's position and movement sensor (part 59125) and actuator (part 57125) which are connected to the CPU 450.

Subroutine 600 (FIG. 6) illustrates the preferred method of initializing the machine and inventory and dispensing system at system runtime. The process begins at step 601 when the system application is launched. Step 602 reads in and parses the lighting XML file 603. The lighting file contains a sequence of lighting sequences to be performed for various user actions on the system such as selecting a product or category, adding to the virtual shopping bag and removing it from the shopping bag. These lighting sequences dictate both the onscreen coloring of products in the virtual display and the lighting of products in the physical display. These values are cached in local memory as an application variable. Step 604 checks if there are any fatal errors. Fatal errors are ones that prevent the system from allowing a user to complete a transaction. All errors are logged using the reporting and logging system 303 (FIG. 3). Non-fatal errors are noted in the log file so they can be examined later to correct the issue. If the error is fatal, the process goes to step 605 where the user is notified of an error and given customer support information and an alert notification is sent out to the notification system 303 (FIG. 3). The system is placed in an idle state where the touch screen will display a message noting that the machine is currently not in service. The system will attempt to recover in step 606 by attempting to start the application process again and reinitialize the system. If there are no fatal errors, the process continues to step 607 that reads in and parses the planogram file 608. The planogram file contains the product identification number, or item identification number, a product name and a Boolean value if it is active or not for each display slot number. These values are cached in local memory as an application variable. Step 609 checks if there are any fatal errors. If there are fatal errors, it routes to step 605, otherwise the process continues at step 610. Step 610 reads in all of the inventory XML files. These files instruct the system on what inventory cabinets are attached to the machine and what inventory is in what inventory slots. Each inventory slot is designated by the cabinet it is located in, the shelf it is on, the size of the inventory slot and the motors that drive the dispensing mechanism. Using this information, the application can determine the shelf location (height). The XML file information is cached and then accessed during product dispensing to guide the robotic gantry elevator to the correct shelf height to collect a product.

The dispensing motor information is used by the dispenser control to turn on the motor that dispenses the product until a mechanical switch is activated determining the product has been dispensed to the gantry elevator. Because of the centralized layout of the robotic gantry, it does not matter which inventory system is connected or even what side from which the product is being dispensed. It only matters what shelf the product is on so the elevator can move to the correct height to collect the product. Step 610 reads in all of the screen templates 611 that determine the layout of the visual selection interface. Step 612 checks if there are any fatal errors. If there are fatal errors, it routes to step 605, otherwise the process continues at step 613. Step 613 reads in all of the screen templates 611 that determine the layout of the user interface and all of the screen asset files 614 associated with the screen templates 611.

These asset files can be images or extended markup files that represent buttons, header banners graphics that fit into header areas, directions or instructions that are displayed in designated areas, image map files that determine which area on an image corresponds represents which area on the physical facade or images representing the physical façade. These assets are cached into local memory in the application. Step 615 checks if there are any fatal errors. If there are fatal errors, it routes to step 605, otherwise the process continues at step 616. Step 616 reads and parses the product catalog files 617. The product catalog stores all of information, graphics, specifications, prices and rich media elements (e.g. video, audio, etc.) for each item or product in the system. Each element is organized according to its identification number. These elements can be stored in a database or organized in a file folder system. These items are cached in application memory. Step 618 checks if there are any fatal errors. If there are fatal errors, it routes to step 605, otherwise the process continues at step 619. Step 619 reads in all of the system audio files 620 and the file that the stores the actions with which each audio file is associated. Audio files can be of any format, compressed or uncompressed such as WAV, AIFF, MPEG, etc. An XML file stores the name of the application event and the sound file name and location. Step 621 checks if there are any fatal errors. If there are fatal errors, it routes to step 905, otherwise the process continues at step 622. Step 622 does a system wide hardware check by communicating with the system peripherals and controllers 302 and 308 (FIG. 3). Step 623 checks if there are any fatal errors. If there are fatal errors, it routes to step 605, otherwise the process continues at step 624. Step 624 launches the application display on the touch screen interface. The system then waits for user input 625.

Subroutine 700 (FIG. 7) illustrates the preferred runtime method the machine uses to dispense items to an end user during a user session. The process begins at step 701 after a user completed a transaction that purchases the merchandise about to be vended. This process assumes that a separate process has already checked that the inventory is available for vending and it has been paid for. The routine is passed a list of items to be dispensed. For items that have multiple quantities, each item is listed as a separate item. Step 702 reads this list into the process memory. Step 703 determines if the dispensing system is busy processing another request. If the dispensing system is busy for any reason, step 704 pings the resource until it is free and then directs the process to step 708 where the first (or next) item in the list is read. Step 705 is a timer that monitors step 704 to determine if the wait for the resource times out to a preset time. If it does time out, the process is considered to have an error and it directs control to step 706 that sends out an alert using the notification system designated by 303 (FIG. 3). Step 707 attempts the recovery of the system by running any preprogrammed diagnostics and self repairing routines that check and restart power and communication links to the system. If the system cannot automatically recover, the machines goes into an idle state and a message is displayed on the main screen indicating the machine is currently out of service preventing users from using the system. If the system resources are free, step 708 reads the next item to be vended from the list and retrieves its associative information into memory. This information was originally loaded into the system as the inventory XML file 611 (FIG. 6) read into memory in step 610. The item, or product id is used to retrieve this information. Information associated with the identification number includes the item's location in the inventory system (shelf height and corresponding elevator position represented as the position the elevator needs to be in to properly collect the dispensed product), the dispensing motors associated with vending the item from the inventory shelf and item details such as its name to prompt the user, and its weight and dimensions which are used in conjunction with the product weight sensor 484 (FIG. 6) to determine a successful vend.

Figure 6:
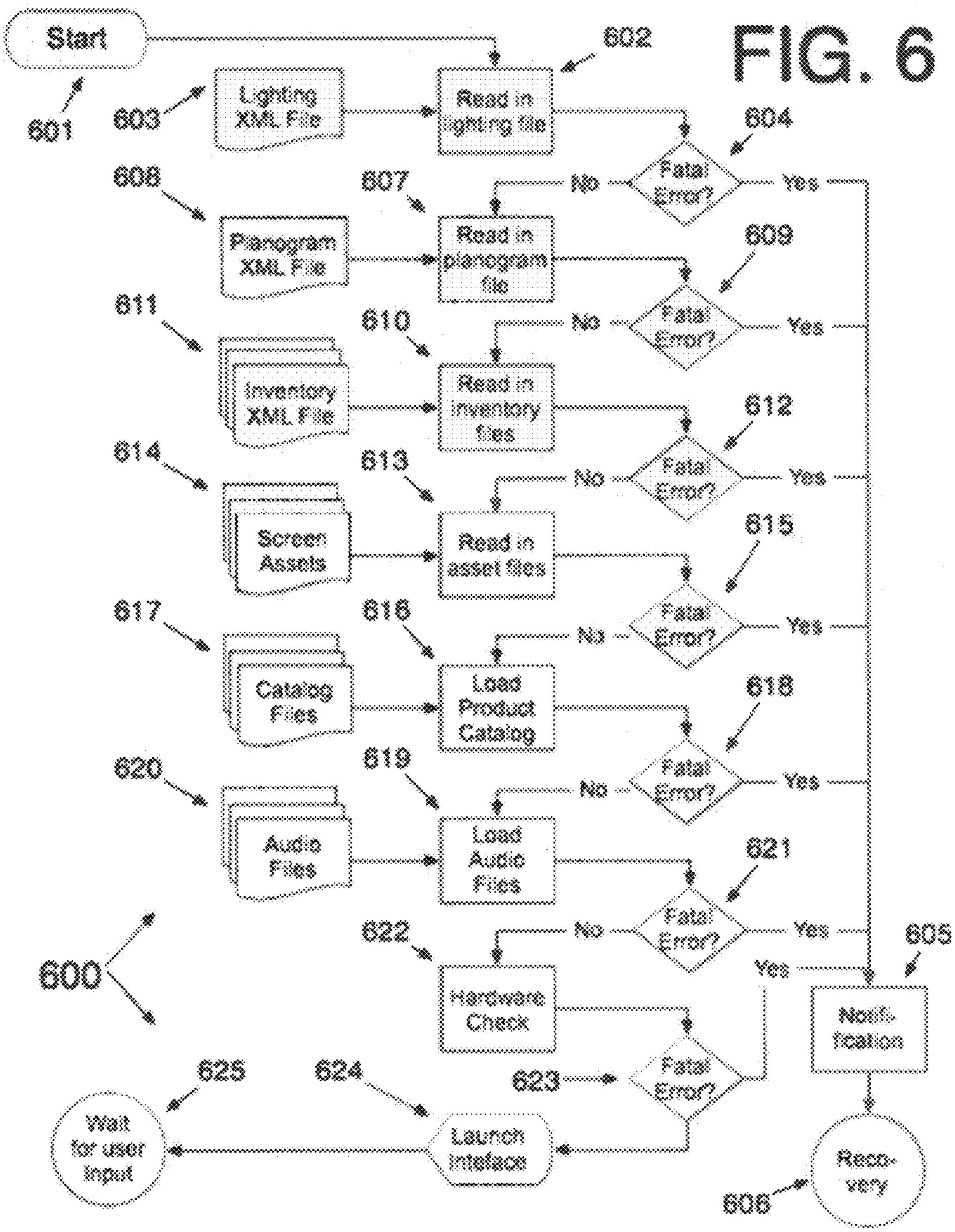
FIG. 6 is a software block diagram of the preferred machine runtime initialization process.
Figure 7:
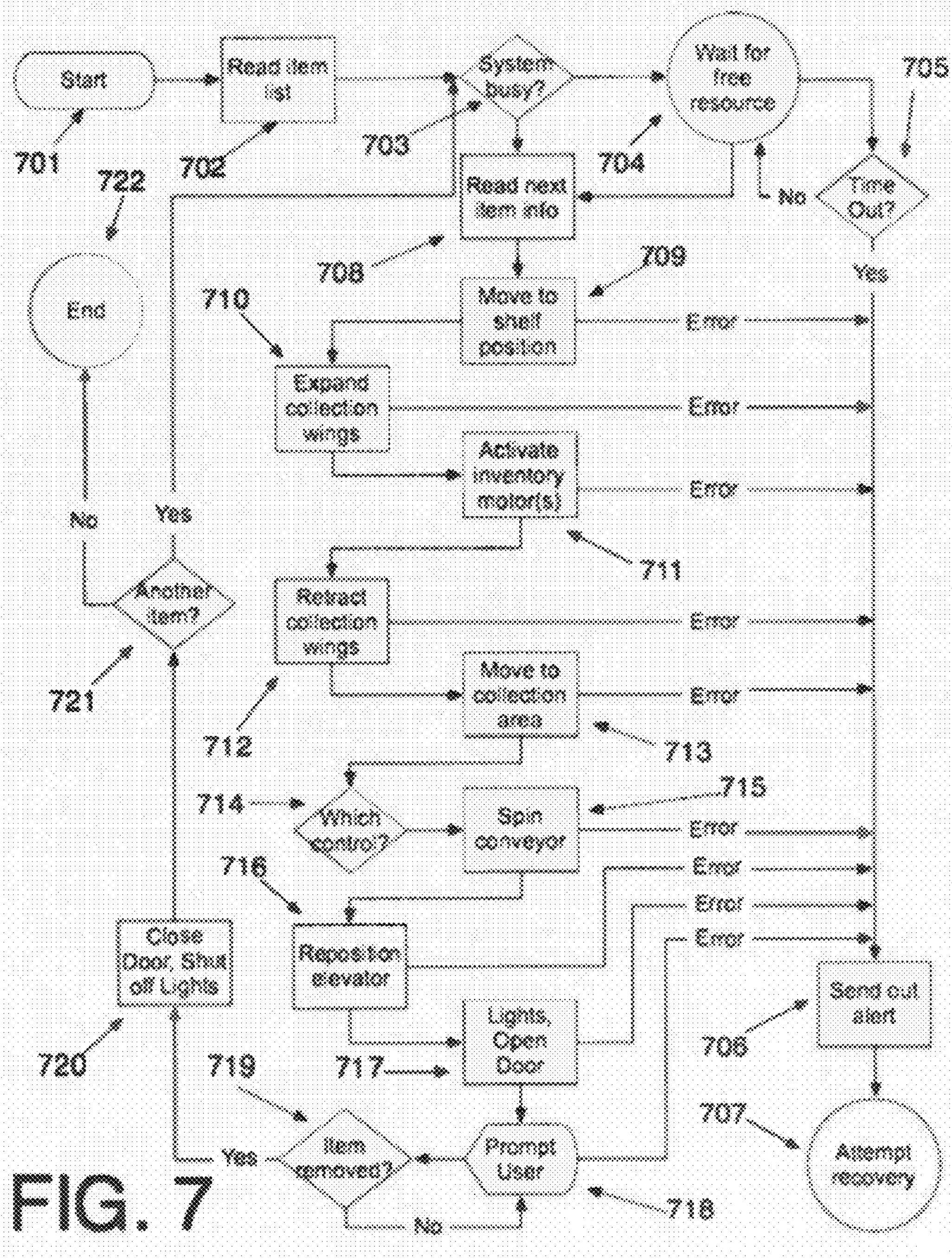
FIG. 7 is a software block diagram of the preferred machine runtime dispensing process.

Step 709 uses this information to move the elevator tray assembly 107 (FIG. 1A) to the correct shelf height for the current item being vended. The elevator height is determined by preset position values that tell the stepper motor where to position itself on the vertical aspect of the gantry. The stepper motor has an encoder that communicates with the controller to verify the position. This combination of hardware allows the software to set a height value and have the stepper motor and the stepper controller ensure the correct position is attained. If there is a detectable error with the elevator mechanics, an error message is generated and sent out by step 706. Step 707 will again try to recover if possible. If the elevator assembly reaches the correct height and position as designated by the product information record, the product collection wings 106 (FIGS. 1A and 1B) are expanded to create an extended landing area that will catch products coming off the inventory trays 213 (FIG. 2). If an error in this process is detected, an error message is generated and step 706 will send out an alert. Otherwise, if the elevator is in position and the production collection wings are extended, step 711 will use the information retrieved in the product record to activate the motor(s) associated with that item of inventory. A mechanical switch is used to indicate that the motor has revolved enough times to properly dispense the product or item off the shelf at which point it falls on to the product collection wings and into the conveyor 105 (FIGS. 1A and 1B). Errors are again detected if present and routed to the notification system in step 706. Step 712 retracts the product collection wings so the elevator can freely move up and down in the dispensing assembly. This step also assists in positioning the product on the conveyor where it can be delivered to the user later in the process. Any detected errors in this step are routed to step 706. If there are no errors, step 713 moved the elevator gantry to the user collection area. The movement of the elevator mechanically opens up the product collection area by activating levers that open the top and back of the area. If no errors are detected, step 714 notes which control activated the dispensing process. This is only relevant when the machine is configured for dual sided vending (see FIGS. 9 and 11). Step 715 then spins the conveyor in the direction of the user that initiated the dispensing process. If no errors were detected, step 716 repositions the elevator that reverses the mechanical operation that opened the back of the collection area and closed it sealing off the internal components of the machine from the user. If no errors were detected, step 717 turns on the lights in the collection area 204 (FIG. 2) and opens the exterior collection area door. Step 718 prompts the user on the screen 202 (FIG. 2) to collect their product. Step 719 monitors signals from the product weight sensor 484 (FIG. 4) records the weight and matches it against the product weight information stored in the inventory XML file 611 (FIG. 6). This sensor could also be a motion or light curtain sensor. If the item was not removed for a preset amount of time, the user is prompted again to collect their item in step 718. If user does not collect their product after a set number of attempts, an error is generated. If the sensor determines the user has removed their item, the process continues to step 720 where the exterior door is closed and the product collection area lights are turned off. The system again monitors for any mechanical errors in this process (line to step 706 not shown). Step 721 determines if there are any additional items in the list of items to be vended. If there are additional items to be vended, the process routes back to step 703 where it begins again for the next item. If there are no more items to be vended, the process ends at step 722.

Figure 8:
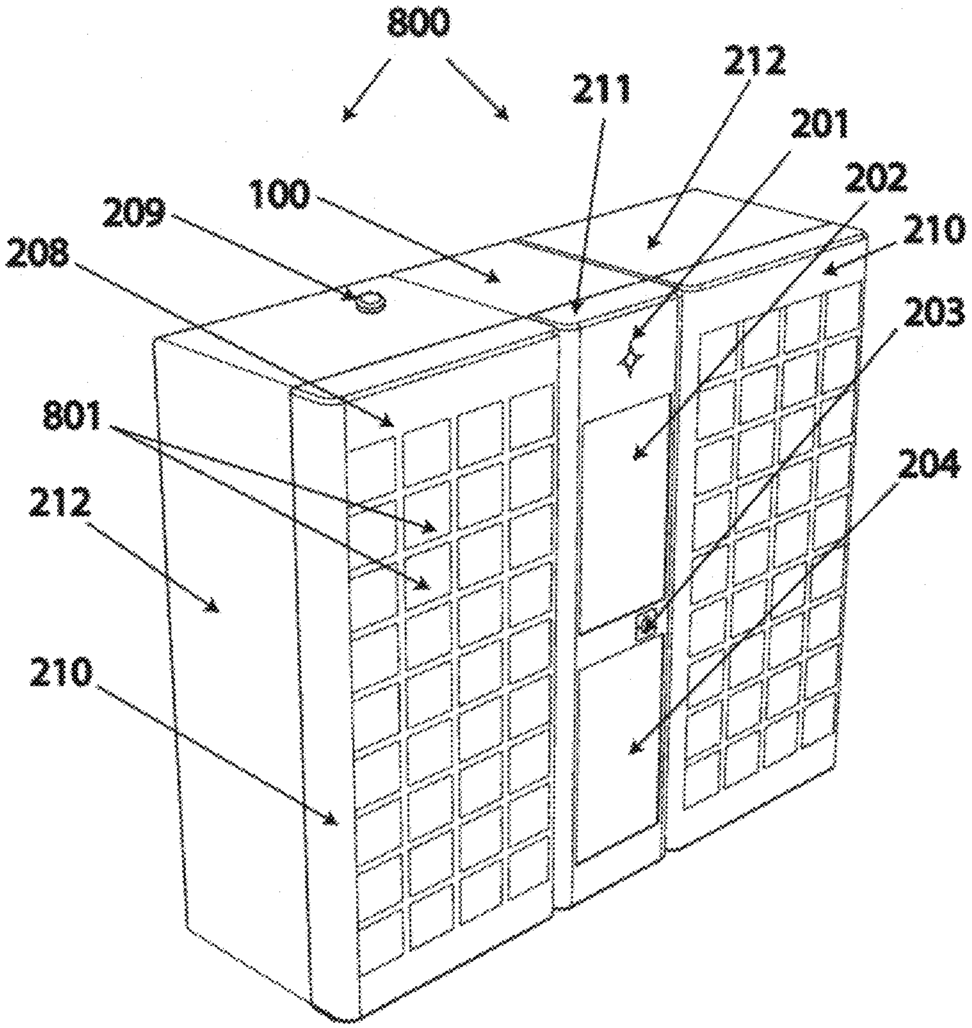
FIG. 8 is an isometric view of an assembled vending machine module with two attached inventory components and an alternative display door design.

With reference directed to FIG. 8, an alternative vending machine 800 constructed in accordance with the best mode of the invention incorporates a variant on the display module designated as 210 in FIG. 2A. In this version the display module has a plurality of generally square product viewing areas 801 that present an alternative display, different from the diamond and circle display windows designated at 206 and 207 respectively in FIG. 2A.

Figure 9:
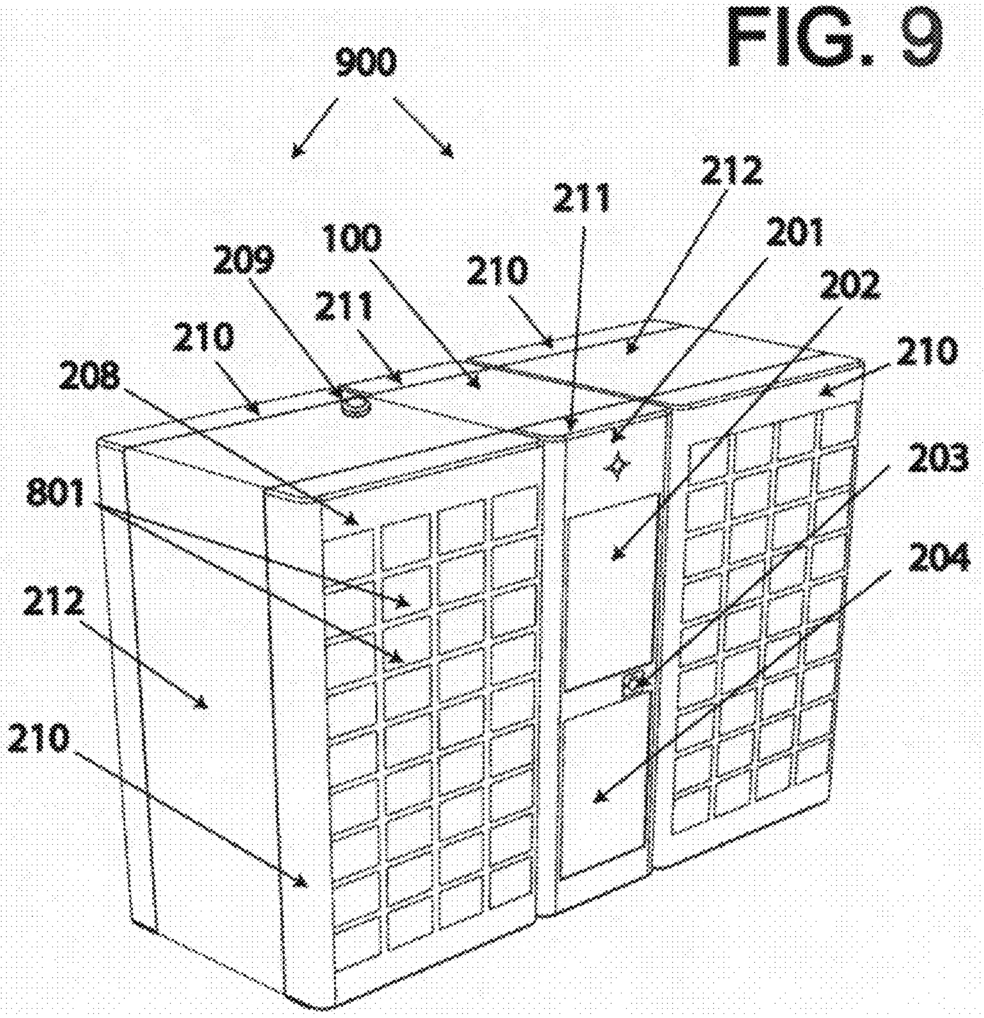
FIG. 9 is an isometric view of an assembled vending machine module configured for dual sided vending with two inventory cabinets.

With reference directed to FIG. 9, an alternative 900 (FIG. 9) shows an alternative configuration of the machine where it has been outfitted to dispense merchandise out of both the front and back of the machine. This machine has display modules 210 affixed to both sides of the inventory cabinet 212. It also has a vertical control column 211 affixed to both sides of the central robotic gantry 100. This configuration allows the unit to serve two people at the same time.

Figure 10:
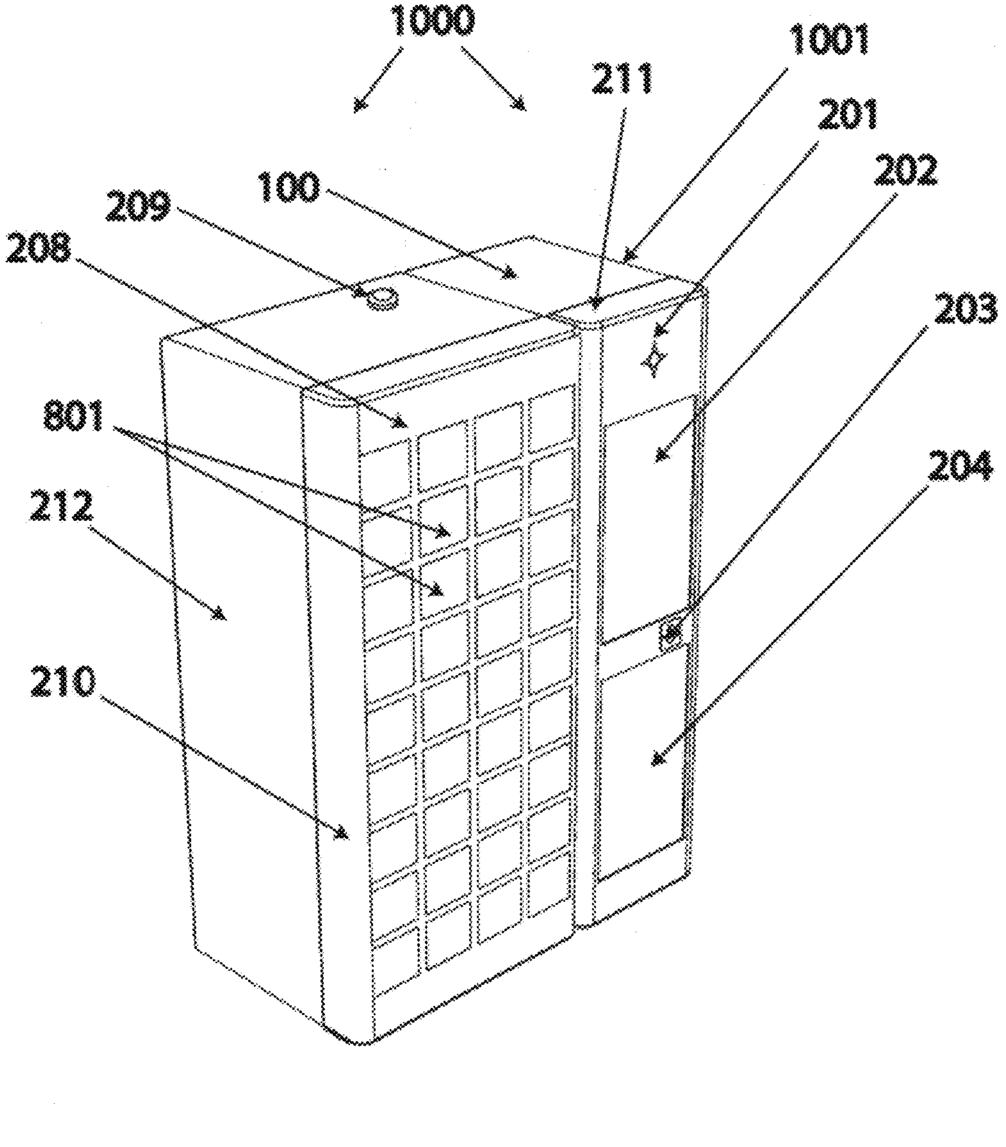
FIG. 10 is an isometric view of an assembled vending machine module with one attached inventory component.

With reference directed to FIG. 10, alternative machine 1000 represents a similar configuration but with only one inventory cabinet 212 and display module 210. These are once again attached to the common centralized robotic dispensing gantry 100. In this configuration a simple metal plate 1001 (not shown) cut the size of the dispensing system tower is affixed to the side where the inventory cabinet was attached in FIG. 8 using the same bolts to secure the system.

Figure 11:
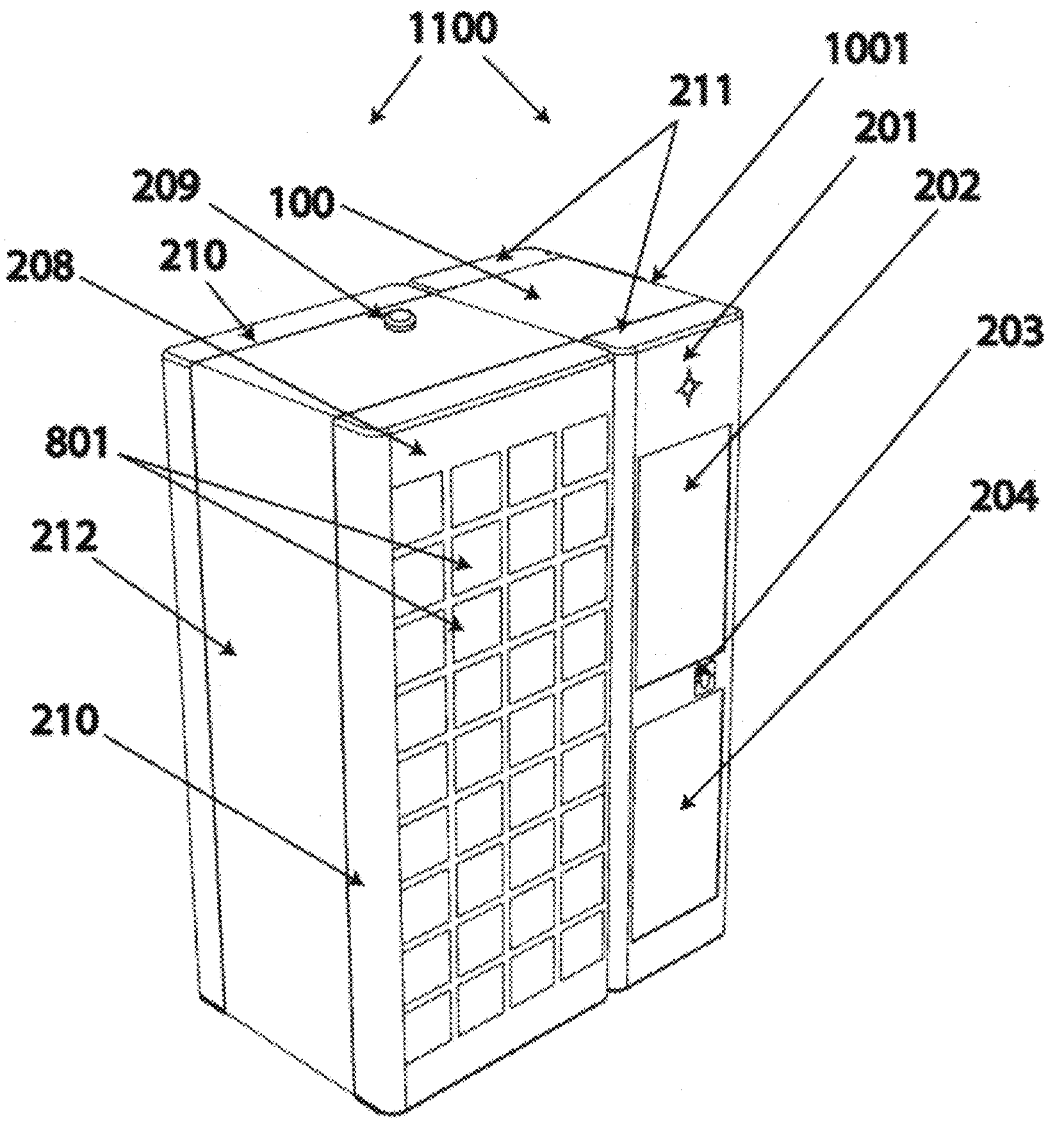
FIG. 11 is an isometric view of an assembled vending machine module configured for dual sided vending with one common inventory cabinet.

With reference directed to FIG. 11, another configuration of a vending machine 1100 utilizes the centralized robotic dispensing gantry 100 with one inventory cabinet and two display modules 210 and two vertical control columns 211. As in FIG. 9, this configuration allows for two users to simultaneously interact with the machine while using only one robotic dispensing mechanism and sharing a common inventory cabinet.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A modularized vending machine, retail display, or automated retail store comprising:

a central robotic gantry comprising an upright enclosure with a pair of sides and a front and a back, an internal elevator vertically movable within the gantry, the elevator comprising a transverse conveyor for moving items laterally and a pair of retractable, product collection wings disposed on either side of the conveyor and displaceable to direct selected products upon the conveyor to deliver a vend, and wherein the wings are actuated by a wing motor that distributes power through a drive shaft that causes a first set of levers to rotate to actuate a second and a third set of levers to operate said collection wings, at least one inventory cabinet attached to at least one gantry side; at least one door fitted upon the front or back of the gantry, the doors comprising a product vend area;

at least one display module proximate said gantry, the display module containing items to be vended, the display module comprising a plurality of physical displays in which items to be vended are visibly housed;

a computer for activating and controlling the gantry and said module; and, software for controlling said computer.

2. The vending machine as defined in claim 1 wherein said third set of levers connect to hinges secured to said collection wings; said hinges comprise followers slots.

3. The vending machine as defined in claim 2 wherein said wing motor rotates said drive shaft which causes the first set of levers to rotate; rotation of the first set of levers causes said second set of levers to contract which pulls said third set of levers downwardly; when said third set of levers move downwardly upper portions of said third set of levers slide within said slots to open the collection wings.

4. The vending machine as defined in claim 3 wherein said wing motor is reversed rotating said drive shaft and said first set of levers to a starting position; rotation of the first set of levers back to the starting position causes said second set of levers to extend which pushes said third set of levers upwardly; when said third set of levers move upwardly upper portions of said third set of levers slide within said slots to close the collection wings.

5. The vending machine as defined in claim 1 wherein the transverse conveyor comprises a flexible sheet entrained about a pair of spaced apart rollers that are journalled for rotation, the conveyor disposed upon a conveyor tray that is vertically displaceable within said gantry.

6. The vending machine as defined in claim 5 further comprising a conveyor drive roller, and a stepper motor for controlling the conveyor drive roller.

7. The vending machine as defined in claim 6 further comprising belt means entrained over pulleys within said gantry for moving said conveyor vertically.

8. The vending machine as defined in claim 1 wherein said gantry can receive products and items dispensed from inventory cabinets of various sizes disposed on either gantry side, and wherein said gantry can dispense products to a user at its front or at its rear.

9. The vending machine as defined in claim 8 further comprising: a conveyor drive roller; a stepper motor for controlling the conveyor drive roller; belt means entrained over pulleys within said gantry for moving said conveyor vertically; wherein said product collection wings open to collect items that are dispensed from inventory area(s) in modules placed on either side of the dispensing gantry.

10. The vending machine as defined in claim 9 wherein: said third set of levers connect to hinges secured to said collection wings; said hinges comprise followers slots; the wing motor rotates said first set of levers which pulls said third set of levers downwardly or pushes said third set of levers upwardly; when said third set of levers move downwardly or upwardly upper portions of said third set of levers slide within said slots to open or close the collection wings.

11. A modularized vending machine, retail display, or automated retail store comprising:

a central robotic gantry comprising an upright enclosure with a pair of sides and a front and a back, an internal elevator, the elevator comprising a transverse conveyor for moving items laterally; a belt pulley mechanism comprising a belt entrained over pulleys within said gantry for moving said elevator vertically; a motor delivers power to said belt pulley mechanism through an elevator drive shaft connected at either end to flex couplers comprising helical beam couplings having two sets of spiral slots to compensate for misalignment;

at least one inventory cabinet attached to at least one gantry side; at least one door fitted upon the front or back of the gantry, the doors comprising a product vend area;

at least one display module proximate said gantry, the display module containing items to be vended, the display module comprising a plurality of physical displays in which items to be vended are visibly housed;

a computer for activating and controlling the gantry and said module; and, software for controlling said computer.

12. The vending machine as defined in claim 11 wherein the transverse conveyor comprises a flexible sheet entrained about a pair of spaced apart rollers that are journalled for rotation, the conveyor is disposed upon a conveyor tray that is coupled to said belt pulley mechanism with flexible hinge coupler supports.

13. The vending machine as defined in claim 12 further comprising a conveyor drive roller, and a stepper motor for controlling the conveyor drive roller.

14. The vending machine as defined in claim 13 wherein said conveyor comprises a pair of retractable, product collection wings that open when the elevator is in place to collect items that are dispensed from inventory area(s) in modules placed on either side of the dispensing gantry.

15. The vending machine as defined in claim 14 wherein said collection wings are disposed on either side of the conveyor and displaceable by levers to direct selected products upon the conveyor to deliver a vend, and wherein the wings are actuated by a wing motor that distributes power to said levers to operate said collection wings.

16. The vending machine as defined in claim 15 wherein: said levers connect to hinges secured to said collection wings; said hinges comprise followers slots; the wing motor pulls said levers downwardly; when the levers move downwardly lever portions slide within said slots to open the collection wings.

17. The vending machine as defined in claim 11 wherein said gantry can receive products and items dispensed from inventory cabinets of various sizes disposed on either gantry side, and wherein said gantry can dispense products to a user at its front or at its rear.

18. The vending machine as defined in claim 17 further comprising: a conveyor drive roller; a stepper motor for controlling the conveyor drive roller; belt means entrained over pulleys within said gantry for moving said conveyor vertically; a pair of retractable, product collection wings mounted upon said conveyor that open to collect items that are dispensed from inventory area(s) in modules placed on either side of the dispensing gantry.

19. The vending machine as defined in claim 18 wherein: said collection wings are disposed on either side of the conveyor and displaceable by levers to direct selected products upon the conveyor to deliver a vend; the wings are actuated by a wing motor that distributes power to said levers to operate said collection wings; said levers connect to hinges secured to said collection wings; said hinges comprise followers slots; the wing motor pulls said levers downwardly or push them upwardly; when the levers move downwardly or upwardly lever portions slide within said slots to open or close the collection wings.

* * * * *